United States Patent
Kondo et al.

(10) Patent No.: US 7,069,187 B2
(45) Date of Patent: Jun. 27, 2006

(54) INDIVIDUAL AUTHENTICATION APPARATUS, INDIVIDUAL AUTHENTICATION METHOD, AND COMPUTER PROGRAM

(75) Inventors: Tetsujiro Kondo, Tokyo (JP); Koji Ohta, Tokyo (JP); Kenji Tanaka, Tokyo (JP); Yukihiro Nakamura, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/398,954

(22) PCT Filed: Aug. 5, 2002

(86) PCT No.: PCT/JP02/07952

§ 371 (c)(1),
(2), (4) Date: Apr. 11, 2003

(87) PCT Pub. No.: WO03/017117

PCT Pub. Date: Feb. 27, 2003

(65) Prior Publication Data

US 2003/0191594 A1    Oct. 9, 2003

(30) Foreign Application Priority Data

Aug. 13, 2001    (JP) .............................. 2001-245412

(51) Int. Cl.
*G06F 12/14*    (2006.01)
(52) U.S. Cl. ..................... 702/188; 702/182
(58) Field of Classification Search ........ 702/182–188; 713/168, 169, 182–186; 709/227–229
See application file for complete search history.

(56) References Cited

U.S. PATENT DOCUMENTS

| | | | | |
|---|---|---|---|---|
| 5,229,764 A | * | 7/1993 | Matchett et al. ........... | 340/5.52 |
| 5,615,277 A | * | 3/1997 | Hoffman ...................... | 382/115 |
| 5,768,387 A | | 6/1998 | Akiyama et al. ........... | 713/182 |
| 5,887,140 A | * | 3/1999 | Itsumi et al. ................ | 709/225 |
| 6,076,167 A | * | 6/2000 | Borza ........................... | 713/201 |
| 6,163,616 A | * | 12/2000 | Feldman ...................... | 382/115 |
| 6,256,737 B1 | * | 7/2001 | Bianco et al. .............. | 713/186 |
| 6,343,140 B1 | * | 1/2002 | Brooks ........................ | 382/115 |
| 6,687,390 B1 | * | 2/2004 | Avni et al. ................... | 382/119 |

FOREIGN PATENT DOCUMENTS

| | | | |
|---|---|---|---|
| CN | 1140279 A | | 10/1995 |
| JP | 8-55021 | | 2/1996 |
| JP | 10-161977 | * | 6/1998 |
| JP | 11-143831 | | 5/1999 |
| JP | 2001-092783 | * | 4/2001 |
| JP | 2001-92783 | | 4/2001 |

* cited by examiner

*Primary Examiner*—Marc S. Hoff
*Assistant Examiner*—Janet L Robbins
(74) *Attorney, Agent, or Firm*—Frommer Lawrence & Haug LLP; William S. Frommer; Samuel S. Lee

(57) ABSTRACT

An authentication processing apparatus for performing authentication based on a user's normal operation is provided. The authentication processing apparatus performs the authentication processing on the basis of operation information obtained from normally operating an information processing apparatus. Operation information obtained from operating an input unit by the user, such as a keyboard inputting mode, is obtained to serve as operation information, and the obtained operation information is checked against operation information registered in a database to perform authentication. Authentication is thus made possible without requiring the user to perform the special input processing for the authentication processing. Authentication is performed taking into consideration a plurality of pieces of operation information. With the checking processing in which less dispersed data is weighted, user authentication with high accuracy is made possible.

28 Claims, 13 Drawing Sheets

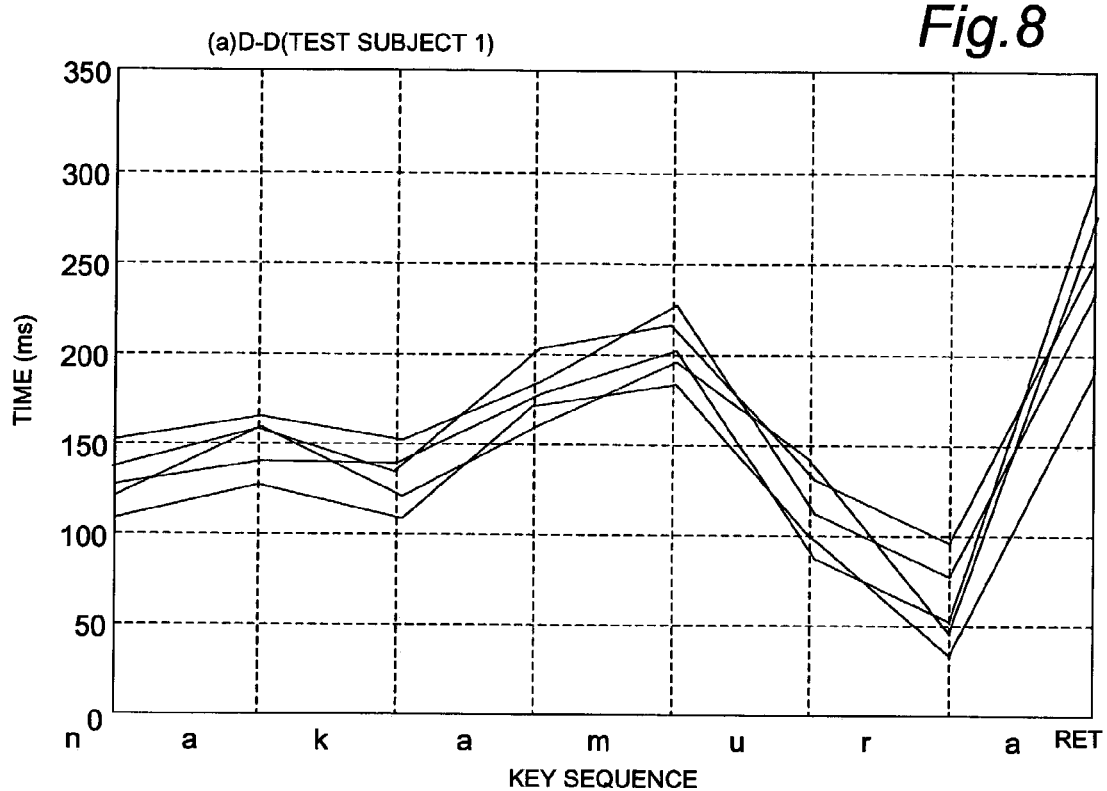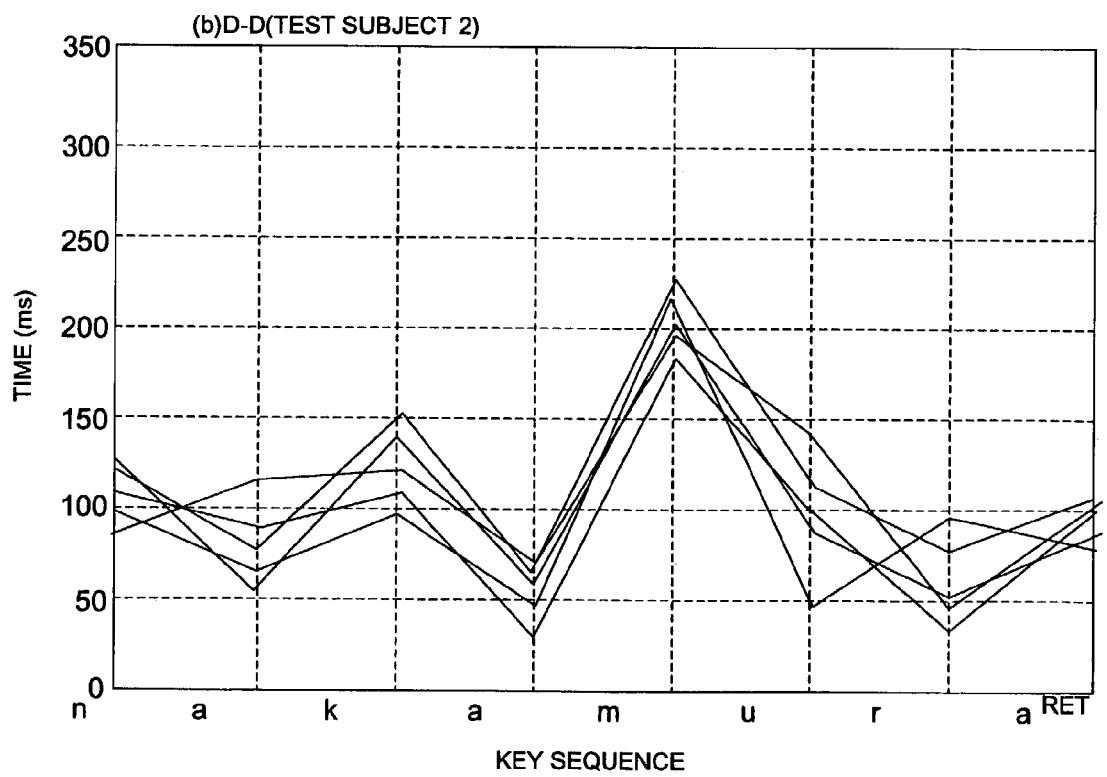
Fig. 8

INDIVIDUAL AUTHENTICATION APPARATUS, INDIVIDUAL AUTHENTICATION METHOD, AND COMPUTER PROGRAM

TECHNICAL FIELD

The present invention relates to individual authentication processing apparatuses and individual authentication processing methods, and more particularly to an individual authentication processing apparatus and individual authentication processing method for performing authentication based on an individual's operation characteristics included in normal keyboard operations by the individual for which authentication is performed and to a computer program.

BACKGROUND ART

One typical known individual authentication processing system performs authentication based on a key such as a password. FIG. 1 shows a processing sequence of a known authentication system for performing authentication by receiving a password at the time the processing on an information processing apparatus (for example, a PC) starts.

FIG. 1 shows time course in the abscissa axis and illustrates the processing performed in accordance with the flow of time. An authentication unit 101 performs the authentication processing. The authentication unit 101 is provided in the interior of an information processing apparatus used by unspecified users, such as a PC serving as a user terminal or an information terminal or financial terminal located in a public place, or a server connected with a network over which user input information can be transferred.

The authentication unit 101 stores a password corresponding to a pre-registered user in a storage unit and checks a password input from a user against the password stored in the storage unit. When the checking processing determines that the password input from the user agrees with the password stored in the storage unit, it is determined that the authentication is successful. If the two passwords disagree with each other, it is determined that the authentication is unsuccessful.

Only when the authentication is successful, the processing based on a user operation performed subsequent to the authentication is performed. The user operation is diverse, ranging from, for example, obtaining data from storage means in a PC having the authentication unit, updating data, drawing money from the financial terminal, and downloading data from the server through the network.

The processing sequence shown in FIG. 1 is such that, when the authentication is successful on the basis of the password input once, a series of subsequent processes is unconditionally performed. For example, a user of a PC is authenticated using a password prior to operating the PC, as shown in FIG. 1. The user who has been authenticated leaves the PC. When a different user operates the PC, the processing based on the operation is performed. As discussed above, the configuration dependent solely on authentication executed as the so-called log-in processing is disadvantageous in that, when an operation is subsequently performed by a different user, the operation cannot be distinguished from the processing by the authenticate user.

In order to remove such disadvantages, for example, there is a processing sequence shown in FIG. 2. Similar to FIG. 1, FIG. 2 shows time course in the abscissa axis and illustrates the processing performed in accordance with the flow of time. An authentication unit 201 performs the authentication processing. Similar to FIG. 1, the authentication unit 201 is provided in the interior of an information processing apparatus used by unspecified users, such as a PC serving as a user terminal or an information terminal or financial terminal located in a public space, or a server connected with a network over which user input information can be transferred.

The processing sequence shown in FIG. 2 performs the authentication processing every time the user operation is performed. When the authentication is successful once, only one operation immediately after the authentication is permitted. As discussed above, the authentication processing and operation permission are repetitively performed every time an operation is performed. Accordingly, unauthorized use by a different user, which is described with reference to FIG. 1, can be eliminated. However, the processing sequence of FIG. 2 requires the user to input a key such as a password every time the user performs an operation. As a result, the operation becomes complicated, and the processing efficiency is reduced.

DISCLOSURE OF INVENTION

In view of the foregoing problems, the present invention provides the configuration for obtaining personal characteristics from operations performed by a user and sequentially performing the authentication processing based on the obtained personal characteristics.

It is an object of the configuration of the present invention to solve the problems of the log-in authentication described using FIG. 1, that is, the problem in that an operation by a different user cannot be distinguished subsequent to authentication, and to provide an individual authentication processing apparatus, an individual authentication processing method, and a computer program for eliminating the necessity to input a key such as a password every time an operation is performed, which is described using FIG. 2.

A first aspect of the present invention is an individual authentication processing apparatus for performing individual authentication. The individual authentication processing apparatus obtains normal operation information from normally operating, by a user, input means of an information processing apparatus; extracts an individual's operation characteristic information from the normal operation information; checks the individual's extracted operation characteristic information against a registered user's operation characteristic information stored in storage means; generates, on the basis of a result of the checking processing, permission information for determining whether or not to permit the processing in accordance with user operation of the input means to be performed on the information processing apparatus; and outputs the generated permission information to the information processing apparatus.

According to an embodiment of the individual authentication processing apparatus of the present invention, when generating the permission information, the individual authentication processing apparatus refers to past checking log data stored in a checking result memory that stores past checking results, generates the permission information based on the checking log data, and outputs the permission information to the information processing apparatus.

According to the embodiment of the individual authentication processing apparatus of the present invention, the operation characteristic information is information on characteristics of key input with a keyboard serving as the input means. The operation characteristic information is information including DDn representing time from pressing a previously input key to pressing a subsequently input key; UDn representing time from pressing a key to releasing the key; and DUn representing time from releasing the previously input key to pressing the subsequently input key. The checking processing against the registered user's operation characteristic information stored in the storage means is performed by comparing a distance value d with a predetermined threshold, the distance value d being between input vectors DD, UD, and DU formed of the DDn, UDn, and DUn and mean vectors [DD], [UD], and [DU] of the registered user's operation characteristic information stored in the storage means.

According to the embodiment of the individual authentication processing apparatus of the present invention, the distance value d is computed on the basis of the equation $d=|DD-[DD]|+k|UD-[UD]|+l|UD-[DU]|$ where k and l are coefficients.

According to the embodiment of the individual authentication processing apparatus of the present invention, the storage means stores integrated pieces of operation characteristic information data concerning the same operation by the registered user. The checking processing of the operation characteristic information extracted from the normal operation information is performed by weighting less dispersed data of the integrated pieces of characteristic information data concerning the same operation by the registered user, which are stored in the storage means, more heavily than widely dispersed data.

According to the embodiment of the individual authentication processing apparatus of the present invention, the operation characteristic information is information on characteristics of key input with a keyboard serving as the input means. The operation characteristic information is information including DDn representing time from pressing a previously input key to pressing a subsequently input key; UDn representing time from pressing a key to releasing the key; and DUn representing time from releasing the previously input key to pressing the subsequently input key. The checking processing against the registered user's operation characteristic information stored in the storage means is performed by comparing a distance value d with a predetermined threshold, the distance value d being computed on the basis of the equation $d=|(DD-[DD])/\sigma DD|+k|(UD)-[UD])/\sigma UD|+l|(DU-[DU])/\sigma DU|$ where DD, UD, and DU are input vectors formed of the DDn, UDn, and DUn, [DD], [UD], and [DU] are mean vectors of the registered user's operation characteristic information stored in the storage means, σDD, σUD, and σDU are standard deviation vectors obtained on the basis of the registered user's operation characteristic information stored in the storage means, and k and l are coefficients.

According to the embodiment of the individual authentication processing apparatus of the present invention, the individual authentication processing apparatus includes a keyword registration database that stores a word based on which the authentication processing is performed as a keyword. On condition that it is detected that the word registered in the keyword registration database is input from the input means, the checking processing is performed on the basis of normal operation information obtained from normally operating the input means by the user.

According to the embodiment of the individual authentication processing apparatus of the present invention, the normal operation information is information concerning an operation sequence of a mouse. The storage means stores the registered user's mouse operation sequence information as the operation characteristic information. The checking processing is performed by checking against the mouse operation sequence information.

According to the embodiment of the individual authentication processing apparatus of the present invention, the normal operation information is information concerning a processing sequence of a program executable by the information processing apparatus. The storage means stores the registered user's program processing sequence information as the operation characteristic information. The checking processing is performed by checking against the program processing sequence information.

According to the embodiment of the individual authentication processing apparatus of the present invention, the normal operation information is information on the frequency of inputting a specific key. The storage means stores the registered user's specific key inputting frequency information as the operation characteristic information. The checking processing is performed by checking against the specific key inputting frequency information.

According to the embodiment of the individual authentication processing apparatus of the present invention, the individual authentication processing apparatus includes an operation unit serving as the input means that outputs a code in accordance with the user operation; an extraction unit that extracts an individual's operation characteristic information from normal operation information obtained from normally operating the operation unit by a user; a checking unit that checks the individual's operation characteristic information extracted by the extraction unit against a registered user's operation characteristic information pre-registered in a storage medium; and an output unit that outputs permission information to the information processing apparatus in accordance with a checking result by the checking unit, the permission information permitting the processing in accordance with user operation of the input means to be performed on the information processing apparatus. The extraction unit generates the individual's operation characteristic information at least based on output time and output transition time, the output time being from output start time to output end time of the code output from the operation unit, and the output transition time being generated from the output end time of the output code and output start time of a code output subsequent to the code.

According to the embodiment of the individual authentication processing apparatus of the present invention, the extraction unit generates the individual's operation characteristic information on the basis of code interval time, which is a difference between the output start time of the code output from the operation unit and the output start time of the code output subsequent to the code.

According to the embodiment of the individual authentication processing apparatus of the present invention, the checking unit performs the checking processing by computing and comparing the registered user's output time and output transition time registered in the storage medium with the output time and the output transition time generated by the extraction unit.

According to the embodiment of the individual authentication processing apparatus of the present invention, the extraction unit weights and adds a difference between the registered user's output time registered in the storage medium and the output time generated by the extraction unit and a difference between the registered user's output transition time registered in the storage means and the output transition time generated by the extraction unit and compares the sum with a threshold.

According to the embodiment of the individual authentication processing apparatus of the present invention, the individual authentication processing apparatus includes an operation unit serving as the input means that outputs a code in accordance with the user operation; an extraction unit that extracts an individual's operation characteristic information based on output time from output start time to output end time of the code output from the operation unit; a storage medium that records the operation characteristic information every time the code is output from the operation unit; a rating unit that rates dispersion of the operation characteristic information recorded in the storage medium; a checking unit that compares the individual's operation characteristic information extracted by the extraction unit with a registered user's operation characteristic information pre-registered in the storage medium and performs the checking processing in accordance with the dispersion of the operation characteristic information rated by the rating unit; and an output unit that outputs permission information to the information processing apparatus in accordance with a checking result by the checking unit, the permission information permitting the processing in accordance with user operation of the input means to be performed on the information processing apparatus.

According to the embodiment of the individual authentication processing apparatus of the present invention, the rating unit rates the dispersion on the basis of standard deviation of a plurality of output times corresponding to the code.

According to the embodiment of the individual authentication processing apparatus of the present invention, the checking unit compares a rated value against a threshold, the rated value being obtained by dividing a difference between output time stored in the storage means and output time newly generated by the extraction unit by the standard deviation.

A second aspect of the present invention is an individual authentication processing method of performing individual authentication, including:

a step of obtaining normal operation information from normally operating, by a user, input means of an information processing apparatus;

a step of extracting an individual's operation characteristic information from the normal operation information and checking the individual's extracted operation characteristic information against a registered user's operation characteristic information stored in storage means; and a step of generating, on the basis of a result of the checking processing, permission information for determining whether or not to permit the processing in accordance with user operation of the input means to be performed on the information processing apparatus and outputting the generated permission information to the information processing apparatus.

According to an embodiment of the individual authentication processing method of the present invention, when generating the permission information, the individual authentication processing method refers to past checking log data stored in a checking result memory that stores past checking results and generates the permission information on the basis of the checking log data.

According to the embodiment of the individual authentication processing method of the present invention, the operation characteristic information is information on characteristics of key input with a keyboard serving as the input means. The operation characteristic information is information including $DD_n$ representing time from pressing a previously input key to pressing a subsequently input key; $UD_n$ representing time from pressing a key to releasing the key; and $DU_n$ representing time from releasing the previously input key to pressing the subsequently input key. The checking processing against the registered user's operation characteristic information stored in the storage means is performed by comparing a distance value d with a predetermined threshold, the distance value d being between input vectors DD, UD, and DU formed of the $DD_n$, $UD_n$, and $DU_n$ and mean vectors [DD], [UD], and [DU] of the registered user's operation characteristic information stored in the storage means.

According to the embodiment of the individual authentication processing method of the present invention, the distance value d is computed on the basis of the equation $d=|DD-[DD]|+k|UD-[UD]|+l|UD-[DU]|$ where k and l are coefficients.

According to the embodiment of the individual authentication processing method of the present invention, the storage means stores integrated pieces of operation characteristic information data concerning the same operation by the registered user. The checking processing of the operation characteristic information extracted from the normal operation information is performed by weighting less dispersed data of the integrated pieces of characteristic information data concerning the same operation by the registered user, which are stored in the storage means, more heavily than widely dispersed data.

According to the embodiment of the individual authentication processing method of the present invention, the operation characteristic information is information on characteristics of key input with a keyboard serving as the input means. The operation characteristic information is information including $DD_n$ representing time from pressing a previously input key to pressing a subsequently input key; $UD_n$ representing time from pressing a key to releasing the key; and $DU_n$ representing time from releasing the previously input key to pressing the subsequently input key. The checking processing against the registered user's operation characteristic information stored in the storage means is performed by comparing a distance value d with a predetermined threshold, the distance value d being computed on the basis of the equation $d=|(DD-[DD])/\sigma DD|+k|(UD)-[UD])/\sigma UD|+l|(DU-[DU])/\sigma DU|$ where DD, UD, and DU are input vectors formed of the $DD_n$, $UD_n$, and $DU_n$, [DD], [UD], and [DU] are mean vectors of the registered user's operation characteristic information stored in the storage means, $\sigma DD$, $\sigma UD$, and $\sigma DU$ are standard deviation vectors obtained on the basis of the registered user's operation characteristic information stored in the storage means, and k and l are coefficients.

According to the embodiment of the individual authentication processing method of the present invention, a keyword registration database is provided that stores a word based on which the authentication processing is performed as a keyword. On condition that it is detected that the word registered in the keyword registration database is input from the input means, the checking processing is performed on the basis of normal operation information obtained from normally operating the input means by the user.

According to the embodiment of the individual authentication processing method of the present invention, the normal operation information is information concerning an operation sequence of a mouse. The storage means stores the registered user's mouse operation sequence information as the operation characteristic information. The checking processing is performed by checking against the mouse operation sequence information.

According to the embodiment of the individual authentication processing method of the present invention, the normal operation information is information concerning a processing sequence of a program executable by the information processing method. The storage means stores the registered user's program processing sequence information as the operation characteristic information. The checking processing is performed by checking against the program processing sequence information.

According to the embodiment of the individual authentication processing method of the present invention, the normal operation information is information on the frequency of inputting a specific key. The storage means stores the registered user's specific key inputting frequency information as the operation characteristic information. The checking processing is performed by checking against the specific key inputting frequency information.

A third aspect of the present invention is a computer program for performing individual authentication, including:

a step of obtaining normal operation information from normally operating by a user, input means of an information processing apparatus;

a step of extracting an individual's operation characteristic information from the normal operation information and checking the individual's extracted operation characteristic information against a registered user's operation characteristic information stored in storage means; and a step of generating, on the basis of a result of the checking processing, permission information for determining whether or not to permit the processing in accordance with user operation of the input means to be performed on the information processing apparatus and outputting the generated permission information to the information processing apparatus.

The computer program of the present invention can be provided by, for example, a storage medium that provides the computer program to a general computer system capable of performing various pieces of program code in a computer-readable format, a communication medium, a recording medium such as a CD, FD, or MO, or a communication medium such as a network. By providing the program in the computer-readable format, the processing in accordance with the program is achieved on the computer system.

Further objects, features, and advantages of the present invention will become apparent from the following description of the preferred embodiments with reference to the attached drawings.

BRIEF DESCRIPTION OF THE DRAWINGS

FIG. 8 includes diagrams for describing differences between individuals in the operation information applicable to the authentication processing according to the present invention.

BEST MODE FOR CARRYING OUT THE INVENTION

With reference to the drawings, an individual authentication processing apparatus and individual authentication processing method of the present invention will be described in detail.

Figure 1:
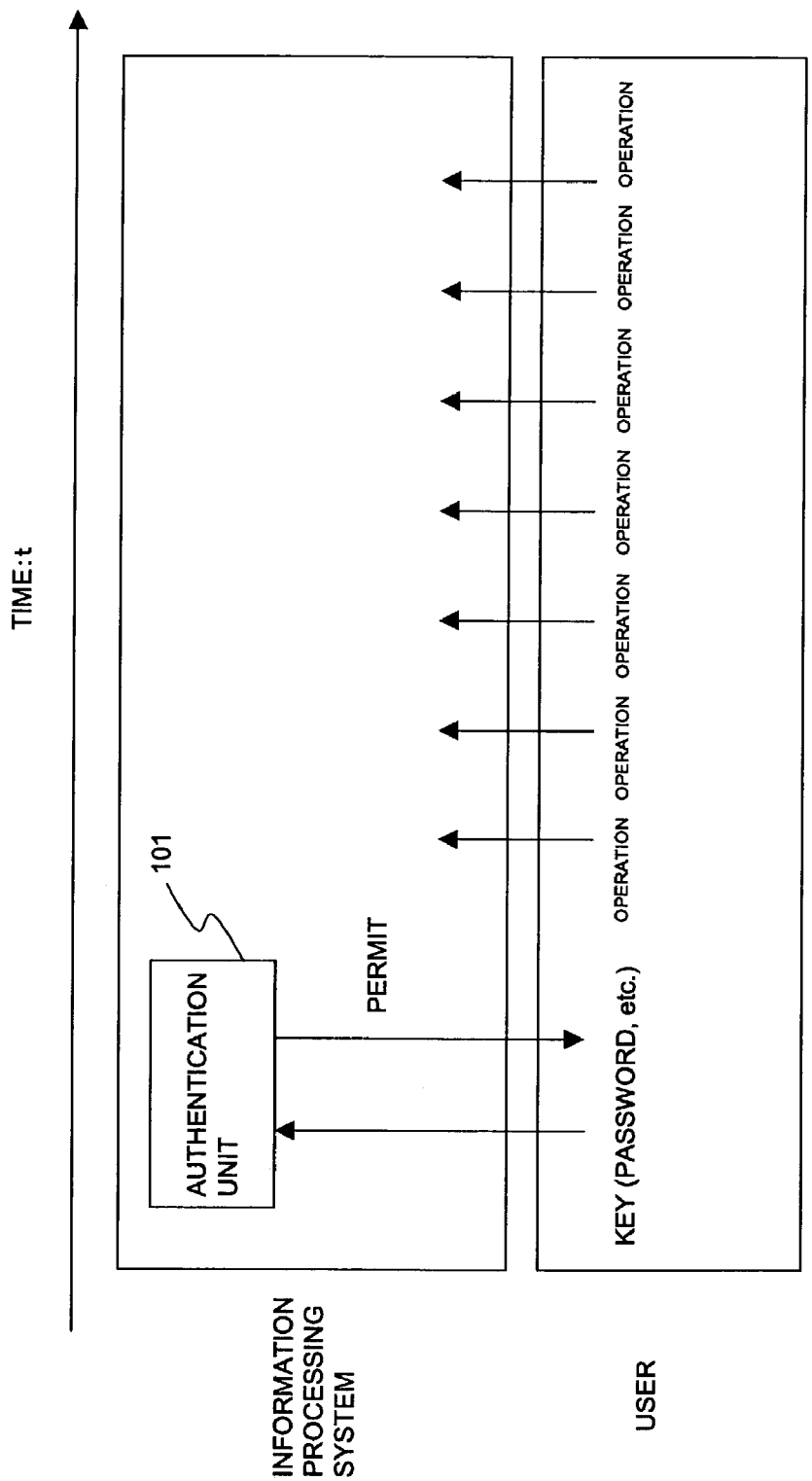
FIG. 1 is an illustration showing an example of a sequence of the known authentication processing and the user-operated input processing (example 1).
Figure 2:
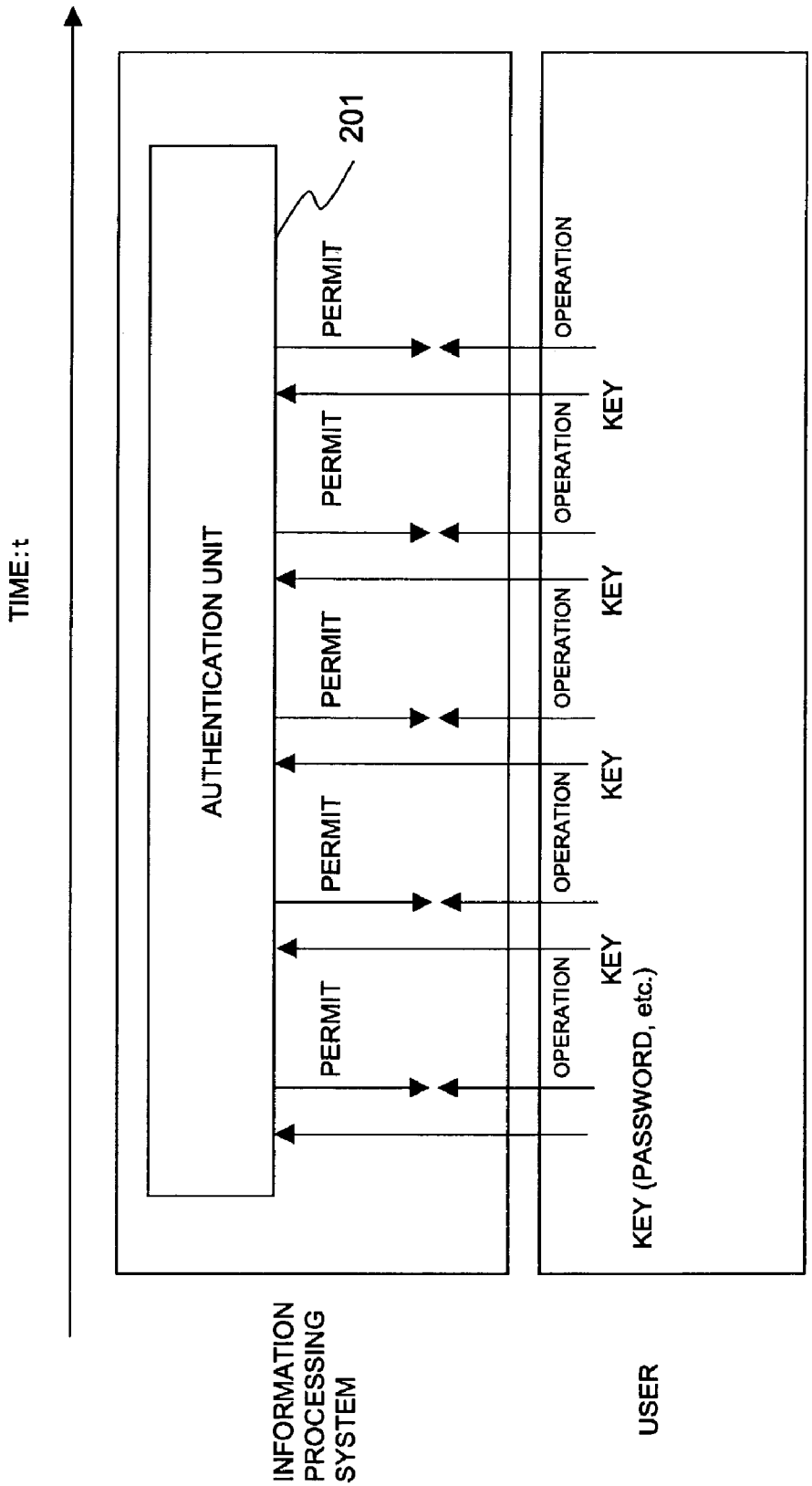
FIG. 2 is an illustration showing an example of a sequence of the known authentication processing and the user-operated input processing (example 2).
Figure 3:
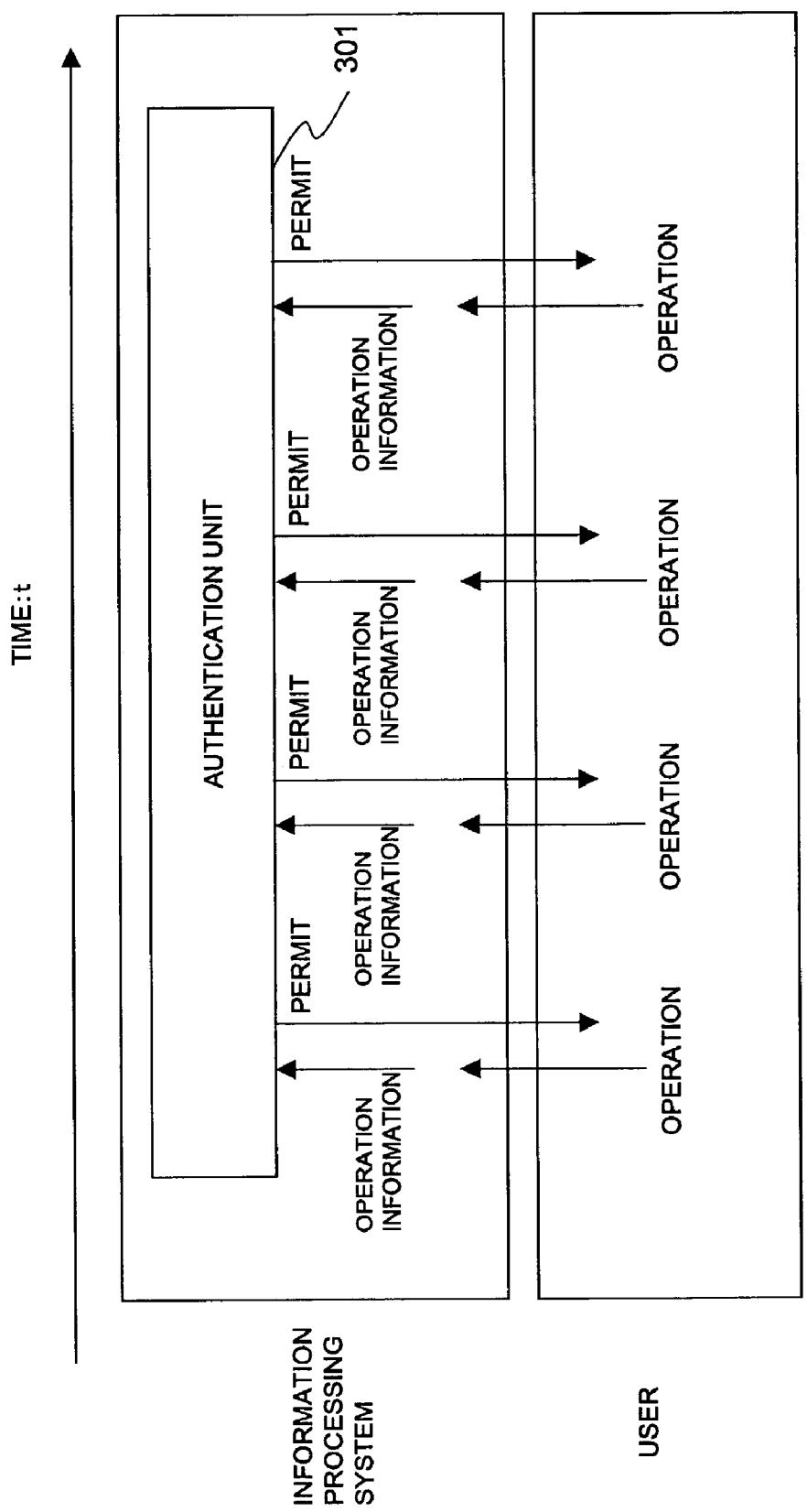
FIG. 3 is an illustration showing a sequence of the authentication processing and the user-operated input processing according to the present invention.

Using FIG. 3, a processing sequence of an individual authentication processing apparatus according to an embodiment of the present invention will now be described. Similar to FIGS. 1 and 2 which have been described in the above description, FIG. 3 shows time course in the abscissa axis and illustrates the processing performed in accordance with the flow of time. An authentication unit 301 performs the authentication processing. The authentication unit 301 is provided in the interior of an information processing apparatus used by unspecified users, such as a PC serving as a user terminal or an information terminal or financial terminal located in a public place, or a server connected with a network over which user input information can be transferred.

The authentication unit 301 stores operation characteristic information on personal characteristics of user operations corresponding to a pre-registered user in a storage unit (database), and the stored information serves as authentication information. Specific modes of the authentication information are described in detail later. For example, various pieces of keyboard operation information include elapsed time data indicating elapsed time from a previous key input to a subsequent key input, time data indicating time during which a key is pressed, and time data indicating time from releasing a previous key to pressing a subsequent key. These various pieces of keyboard operation information are described in detail later.

The authentication unit 301 receives operation information obtained from the actual operation to make a processing request to an information processing apparatus having the authentication unit and performs authentication by checking the operation information against the authentication information stored in the storage unit (database), that is, the pre-obtained personal information based on the user operation. Since authentication is performed on the basis of operation information extracted from the user's normal operation, authentication is performed in accordance with the operation involved in making the user's processing request without causing the user to be aware of the authentication processing.

With this configuration, authentication is performed every time a specific user performs a normal operation. This prevents the problem described with reference to FIG. 1 in that an operation by a different user is falsely recognized as an operation by an authenticate user and is thus executed. Since the user only performs operations in accordance with normal operations, such as making a processing request or inputting data, the user is not required to perform the special processing for authentication, such as inputting a password every time the user performs an operation, as described in FIG. 2. The processing becomes less complicated, and the processing efficiency is enhanced.

Figure 4:
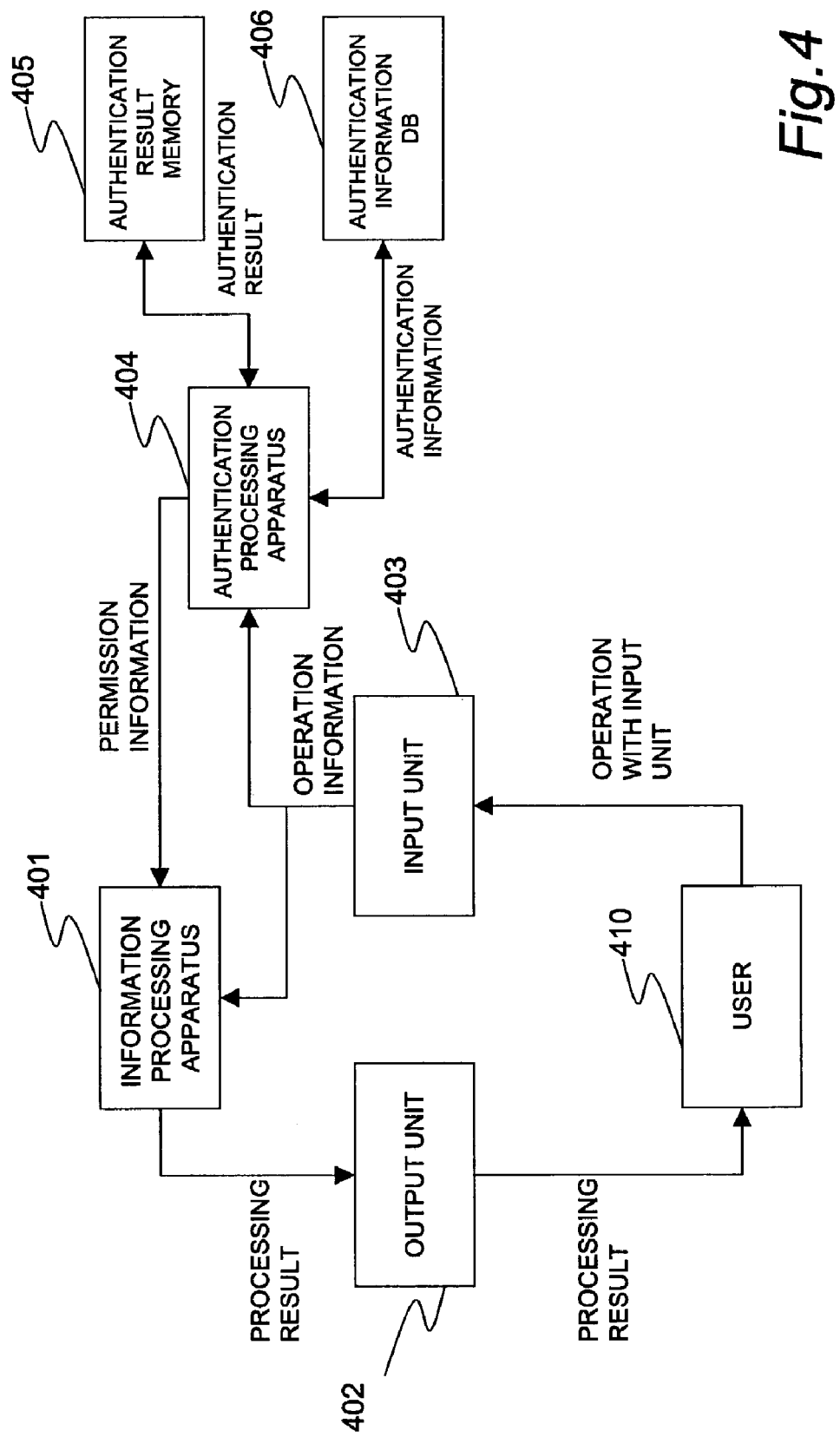
FIG. 4 is a diagram showing an example of the configuration of a system for performing the authentication processing according to the present invention.

FIG. 4 is a block diagram of the configuration of an information processing system having an individual authentication processing apparatus of the present invention. With an input unit 403, a user 410 performs a desired operation, such as inputting data or making a processing request to an information processing apparatus 401. The input unit 403 includes, for example, various input units such as a keyboard and a mouse. The input unit operations include, for example, inputting a word with the keyboard, issuing an application execution (activation) request, designating a file, deleting a file, and clicking on an icon.

Operation information obtained from operating the input unit 403 by the user 410 is input to the information processing apparatus 401 for performing the processing based on the operation information and to an authentication processing apparatus 404 for performing the individual authentication processing. The information processing apparatus 401 receives permission information from the authentication processing apparatus 404, the permission information being based on the result of successful/unsuccessful authentication, which is obtained by the authentication processing by the authentication processing apparatus 404, and determines on the basis of the receipt of the permission information whether or not to perform the processing in accordance with the operation information input from the input unit 403. When the permission information indicates that the authentication is successful, the processing is performed. The processing result is output to, for example, an output unit 402. The output unit 402 is formed of display means, such as a CRT or LCD, or audio output means, such as a speaker.

The authentication processing apparatus 404 receives the operation information from the input unit 403 and extracts an individual's operation characteristic information from the received operation information. The authentication processing apparatus 404 checks the individual's extracted operation characteristic information against authentication information serving as a registered user's operation characteristic information stored in an authentication information database (DB) 406. On the basis of a result of the authentication processing, the authentication processing apparatus 404 generates permission information for determining whether or not to permit the processing to be performed on the information processing apparatus 401 and outputs the permission information to the information processing apparatus 401. In the authentication information database (DB) 406, for example, various pieces of keyboard operation information serving as the registered user's authentication information are registered in conjunction with, for example, a user ID. On the basis of a user ID obtained from the input unit at the time the operation starts, the authentication processing apparatus 404 obtains the registered user's authentication information from the authentication information database (DB) 406. The authentication information database (DB) 406 stores integrated pieces of operation characteristic information data concerning the same operation by the registered user. The checking processing is performed while mean values, dispersion, and standard deviation of the stored data are taken into consideration. The specific mode of the checking processing is described later.

When the number of users for which authentication is performed is small, it is not essential to associate authentication information stored in the authentication information database (DB) 406 with the user ID. Operation information input by a user may be checked against all pieces of authentication information stored in the authentication information database (DB) 406.

Figure 5:
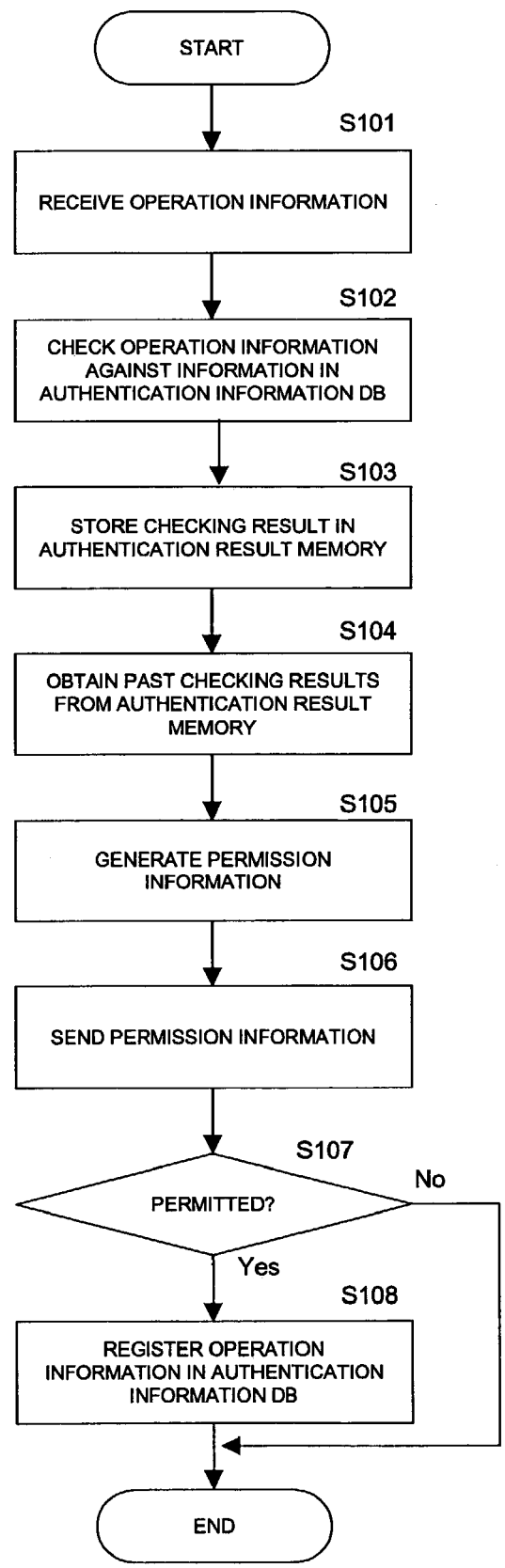
FIG. 5 is a flowchart for describing the processing by an authentication processing apparatus according to the present invention.

FIG. 5 shows a processing flow of the authentication processing apparatus 404. In accordance with the processing flow of FIG. 5, the processing performed by the authentication processing apparatus 404 will now be described. In step S101, the authentication processing apparatus 404 receives operation information based on user operation from the input unit 403. In step S102, the authentication processing apparatus 404 checks the input operation information against data stored in the authentication information database (DB) 406. In step S103, the authentication processing apparatus 404 stores the checking result in an authentication result memory 405. The checking result is data indicating whether or not the input operation information agrees with the data in the authentication information database (DB) 406. In step S104, the authentication processing apparatus 404 obtains past checking results from the authentication result memory 405. The past checking results are, for example, authentication results of the checking performed on the basis of a past series of pieces of operation information obtained from a series of operations described using FIG. 3.

For example, when a series of pieces of authentication log data stored in the authentication result memory 405 indicate that authentication has been continuously successful multiple times, if the most recent checking result indicates that the checked pieces of information agree with each other, the authentication processing apparatus 404 determines that the authentication is successful and thus permits the processing. In contrast, when the results continuously indicate that the checked pieces of information disagree with each other multiple times, another user may have been repetitively trying to establish fraudulent access. It is thus determined that the authentication is unsuccessful, and the processing is thus prohibited. In this case, the number of times the checked pieces of information continuously can disagree with each other is preset by the authentication processing apparatus 404.

Instead of making reference to the authentication log data in the authentication result memory 405, authentication based on the checking processing of the operation information obtained from the input unit 403 against the data stored in the authentication information database (DB) 406 may be performed. In this case, steps S103 and S104 are skipped.

In step S105, the authentication processing apparatus 404 generates permission information based on at least one of the obtained authentication log data and the checking result. In step S106, the authentication processing apparatus 404 outputs the permission information to the information processing apparatus 401. The permission information may be a processing permission signal based on successful authentication or a processing prohibition signal based on unsuccessful authentication. When authentication is successful and permission information indicating that the processing is permitted is thus sent to the information processing apparatus 401, in step S108, the operation information is registered in the Authentication information database (DB) 406, and the processing is terminated. When authentication is unsuccessful and permission information indicating that the processing is prohibited is sent, the operation information is not registered in the authentication information database (DB) 406, and the processing is terminated.

Figure 6:
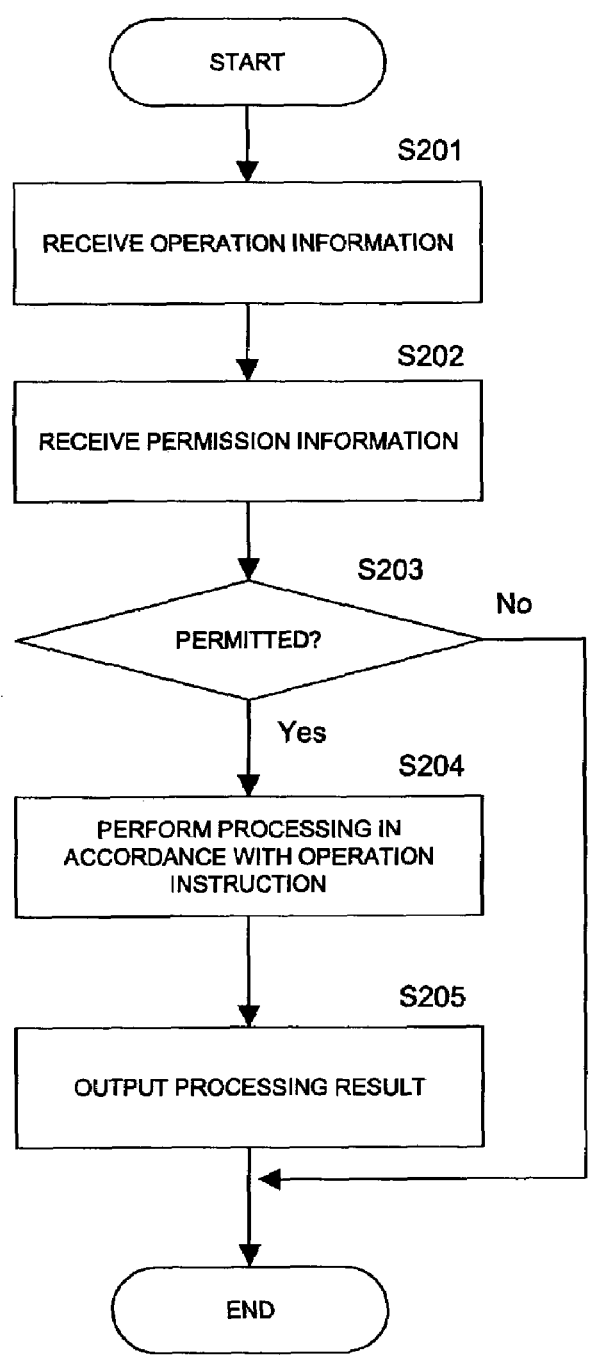
FIG. 6 is a flowchart for describing the processing by an information processing apparatus permitted or prohibited by the authentication processing to perform the processing.

Using FIG. 6, the processing by the information processing apparatus 401 will now be described. The information processing apparatus 401 receives operation information based on user operation from the input unit 403. At the time the operation information is input, the processing based on the operation information does not start. The information processing apparatus 401 waits for receipt of permission information from the authentication processing apparatus 404.

When the information processing apparatus receives in step S202 permission information indicating that the authentication by the authentication processing apparatus 404 is successful or unsuccessful, in step S203, it is determined whether the received permission information indicates that the processing is permitted or prohibited. If the processing is permitted, in step S204, the processing in accordance with the operation information that has been already input from the input unit 403 is performed. In step S205, the processing result is output to the output unit 402. If it is determined in step S203 that the input permission information indicates that the processing is prohibited, the processing in accordance with the input operation information is not performed, and the processing is terminated.

A specific example of the authentication processing performed by the authentication processing apparatus 404 will now be described. A case will now be described in which the authentication processing apparatus 404 receives operation information input with a keyboard serving as the input unit 403 and performs the individual authentication processing based on operation information concerning the keyboard.

With regard to operation information concerning the keyboard, $D_n$ is the time at which n-th key of an input sequence (n-th character of an input character string) is pressed, and Un is the time at which the pressed key is released. The authentication processing apparatus 404 performs the authentication processing based on the following pieces of operation information:

$$DD_n=D_n-D_{n-1} \quad (1)$$

This indicates time from pressing (n−1)th key of an input sequence ((n−1)th character of an input character string) to pressing n-th key.

$$UD_n=U_n-D_n \quad (2)$$

This indicates time from pressing n-th key of an input sequence (n-th character of an input character string) to releasing n-th key.

$$DU_n=D_n-U_{n-1} \quad (3)$$

This indicates time from releasing (n−1)th key of an input key sequence ((n−1)th character of an input character string) to pressing n-th key.

The authentication information database stores the above-described operation information (1) to (3), which are input in accordance with a user permitted to perform the processing on the information processing apparatus.

Figure 7:
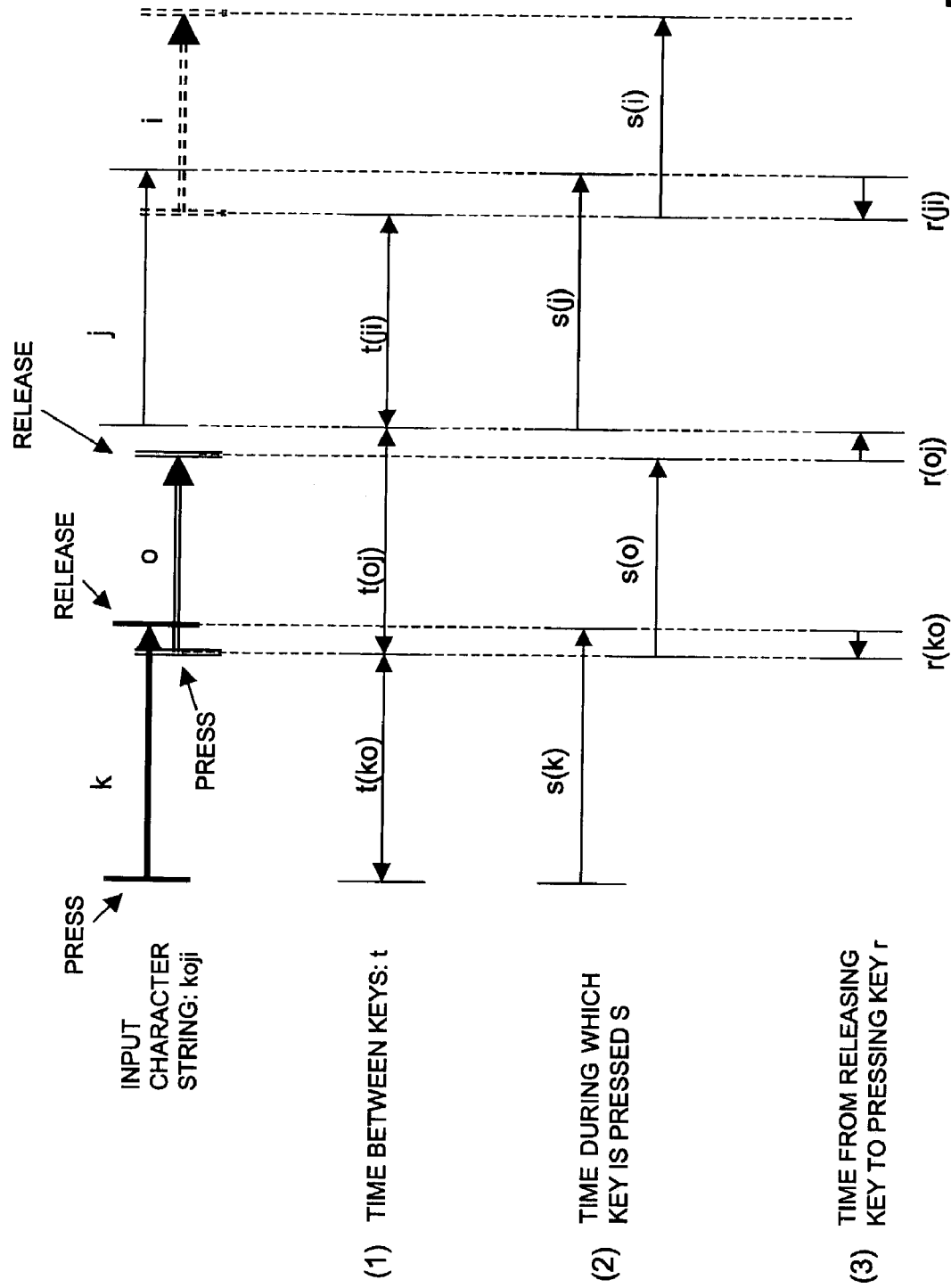
FIG. 7 is a diagram for describing operation information applicable to the authentication processing according to the present invention.

FIG. 7 shows specific examples of the information (1) to (3). In the examples shown in FIG. 7, the user inputs the character string [koji] with the keyboard. FIG. 7 indicates that time flows from left to right.

In FIG. 7, the top row indicates the time at which each character of the character string [koji] is pressed and released. The above-described (1) $DD_n=D_n-D_{n-1}$ corresponds to time shown in FIG. 7(1), that is, t(ko), t(oj), and t(ji); (2) $UD_n=U_n-D_n$ corresponds to time shown in FIG. 7(2), that is, s(k), s(o), s (j), and s(i); and (3) $DU_n=D_n-U_{n-1}$ corresponds to r(ko,), r(oj), and r(ji) shown in (3) of FIG. 7.

For example, t(ko) of (1) indicates time from pressing (n−1)th character (k) of the keyboard to pressing n-th character (o) of the keyboard; s(o) of (2) indicates time from pressing to releasing n-th character (o) of the keyboard; and r(ko) of (3) indicates time from releasing (n−1)th character (k) of the keyboard to pressing n-th character (o) of the keyboard. The data (3) $DU_n=D_n-U_{n-1}$ may have a negative value, such as r(ji) of FIG. 7(3).

According to this embodiment, in the authentication information database (DB) 406, at least one set of the above described (1) $DD_n=D_n-D_{n-1}$, (2) $UD_n=U_n-D_n$, and (3) $DU_n=D_n-U_{n-1}$ is stored to serve as keyboard operation information corresponding to the user authenticated in the past and thus permitted to perform the processing.

FIG. 8 shows data indicating that the above-described information (1) $DD_n=D_n-D_{n-1}$ is applicable to individual identification serving as individual authentication. FIG. 8 shows data obtained from the above-described (1) $DD_n=D_n-D_{n-1}$ of two test subjects 1 and 2 when they input the character string [nakamura] with the keyboard. In FIG. 8, (a) indicates data obtained from test subject 1, and (b) indicates data obtained from test subject 2. Each test subject inputs the character string [nakamura] five times with the keyboard, and data indicating time from pressing (n−1)th character of the keyboard to pressing n-th character of the keyboard is obtained.

It is recognized that, when each test subject has performed the same operation or the same key input multiple times, each test subject has performed operations at approximately the same key pressing intervals between characters. It is also clear that there is a distinct difference in the obtained data of $DD_n=D_n-D_{n-1}$ between test subject 1 and test subject 2. For example, the data (a) obtained from test subject 1 indicates that the time interval between pressing [k] and pressing [a] is greater than the time interval between pressing [a] and pressing [m]. In contrast, the data (b) obtained from test subject 2 indicates that the time interval between pressing [k] and pressing [a] is smaller than the time interval between pressing [a] and pressing [m]. As discussed above, a distinct difference between individuals in inputting the character string is recognized. It is thus possible to extract operation characteristics peculiar to each individual from the input processing performed by each individual using the keyboard.

The authentication processing apparatus 404 checks the operation information on the user for which authentication is performed, which is input with the input unit 403, against the registered data stored in the authentication information database 406. Registered data is stored in the authentication information database 406 every time the authentication processing is performed and authentication is successful. A plurality of pieces of operation information data is stored for each individual. The checking processing have various modes. Specific examples of the checking processing will now be described.

(A) Threshold Determination Processing Based on Norms of Data Vectors

Input data vectors DD, UD, and DU are formed on the basis of the above-described (1) $DD_n=D_n-D_{n-1}$, (2) $UD_n=U_n-D_n$, and (3) $DU_n=D_n-U_{n-1}$. The dimension of each vector is in accordance with a plurality of key inputs of a character string. In other words, if there are n key inputs, the vector is n-dimensional. Mean vectors of the registered data stored in the authentication information database 406 are [DD], [UD], and [DU]. The distance d between the input data and the registered mean data is defined by the following equation:

$$d=|DD-\overline{DD}|+k|UD-\overline{UD}|+l|DU-\overline{DU}| \quad \text{[Formula 1]}$$

where $\overline{XY}$ corresponds to the mean value [XY] in the description.

In the description, mean values are similarly written.

In the above equation, k and l are weight coefficients and are values preset by the authentication processing apparatus.

The distance value d defined by the above equation is compared with a predetermined threshold th. When the distance d is less than the threshold th, that is, when the following holds true:

$$d<th \quad \text{[Formula 2]}$$

it is determined that the authentication is successful. When the above expression does not hold true, that is, when $d \geq th$, it is determined that the authentication is unsuccessful.

Alternatively, the threshold is changed by, for example, loosely setting the threshold in accordance with the authentication status based on a past series of authentication results achieved in a series of operations, which have been described using FIG. 3. The past series of authentication results are stored in the authentication result memory. In contrast, when the past series of authentication results continuously indicate that the checked pieces of information continuously disagree with each other, another user may have been repetitively trying to establish fraudulent access. In this case, the threshold is strictly set.

(B) Threshold Determination by Normalized Distance Based on Standard Deviation of Data Vectors Since the mean vectors [DD], [UD], and [DU] of the plurality of pieces of registered data stored in the authentication information database 406 are applied to the above processing, that is, the norm-based processing, the same rating is applied to a case in which a plurality of pieces of registered data are dispersed widely and to a case in which the pieces of registered data are less dispersed. In order to perform more accurate rating, a distance rating scale for less dispersed registered data is made different from that for widely dispersed registered data. An example is described in which normalization is applied to highly rate the distance obtained from the less dispersed registered data.

Figure 9:
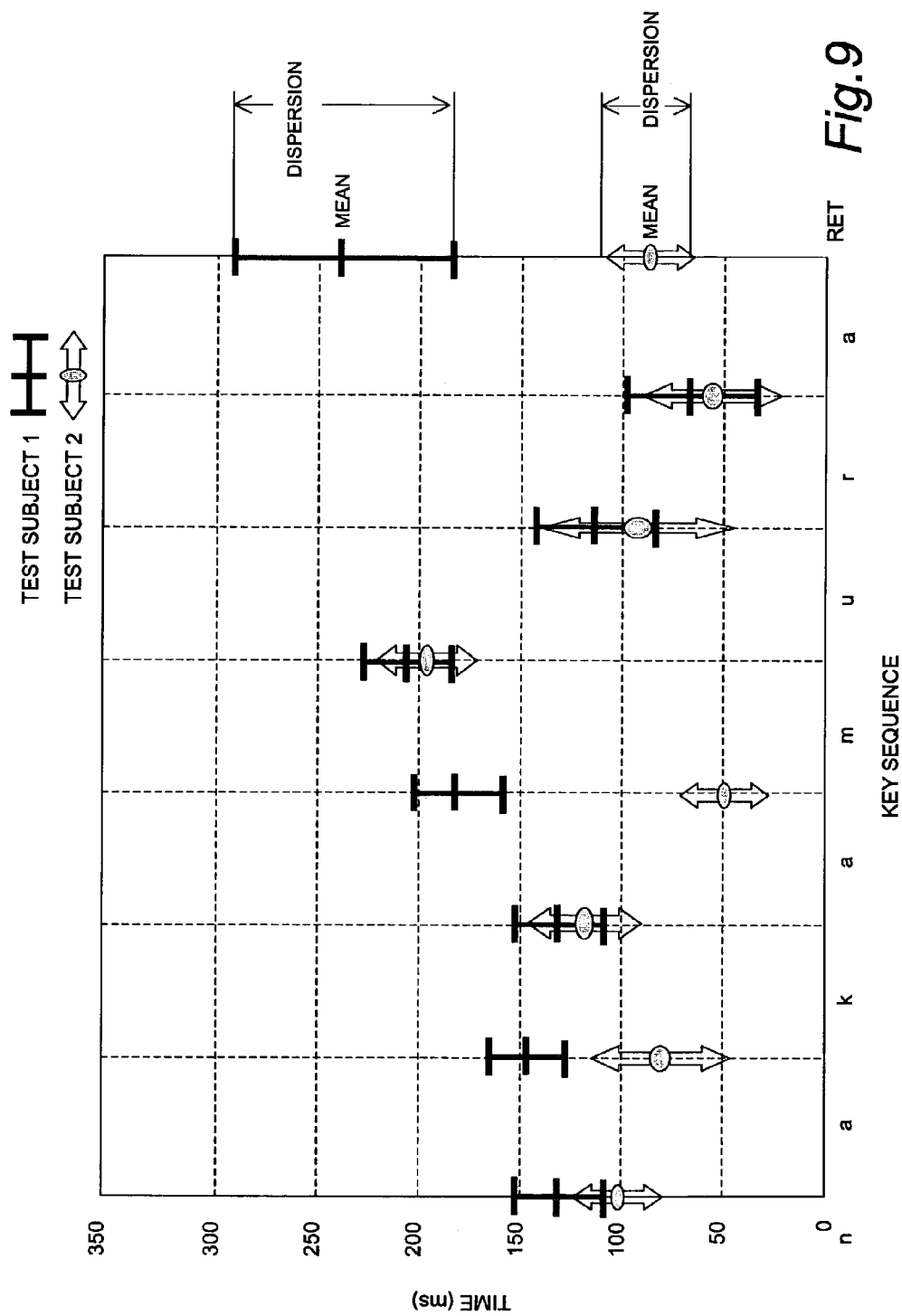
FIG. 9 is a diagram for describing an example of distribution of dispersions and means of the operation information applicable to the authentication processing according to the present invention.

FIG. 9 shows data indicating dispersions and means of key sequence data DD of FIG. 8. FIG. 9 shows dispersions and mean values of a plurality of pieces of registered data (1) $DD_n=D_n-D_{n-1}$ obtained from test subject 1 and test subject 2, that is, data indicating time from pressing (n−1)th character of the keyboard to pressing n-th character of the keyboard. The diagram makes it clear that each test subject's registered data includes relatively concentrated registered data and relatively dispersed data.

For example, the time interval between the key input [u] and the key input [r] by test subject 2 shows a large dispersion. It is difficult to identify an individual on the basis of the distance computed by comparing such largely dispersed data with input data. In contrast, the time interval between the key input [a] and the key input [m] by test subject 2 generates concentrated data. The distance between such data and data obtained from operation information is expected to be small. If the distance is large, it is very likely that the data is input from a different user. In order to highly set the rating of the distance computed from such less dispersed data, standard deviation vectors of the registered data stored in the authentication information database 406 are used.

Input data vectors serving as operation information corresponding to the above-described (1) $DD_n=D_n-D_{n-1}$, (2) $UD_n=U_n-D_n$, and (3) $DU_n=D_n-U_{n-1}$ are DD, UD, DU; mean vectors of the registered data stored in the authentication information database 406 are [DD], [UD], and [DU]; and standard deviation vectors are σDD, σUD, and σDU. The distance d between the input data and the registered mean data is defined by the following equation:

$$d = \left|\frac{DD-\overline{DD}}{\sigma DD}\right| + k\left|\frac{UD-\overline{UD}}{\sigma UD}\right| + l\left|\frac{DU-\overline{DU}}{\sigma DU}\right| \quad \text{[Formula 3]}$$

where k and l are weight coefficients in the above equation and are values preset by the authentication processing apparatus. The distance d defined by the above equation is compared with a predetermined threshold th. When the distance d is less than the threshold th, that is, when the following holds true:

$$d<th \quad \text{[Formula 4]}$$

it is determined that the authentication is successful. When the above expression does not hold true, that is, when $d \geq th$, it is determined that the authentication is unsuccessful.

Figure 10:
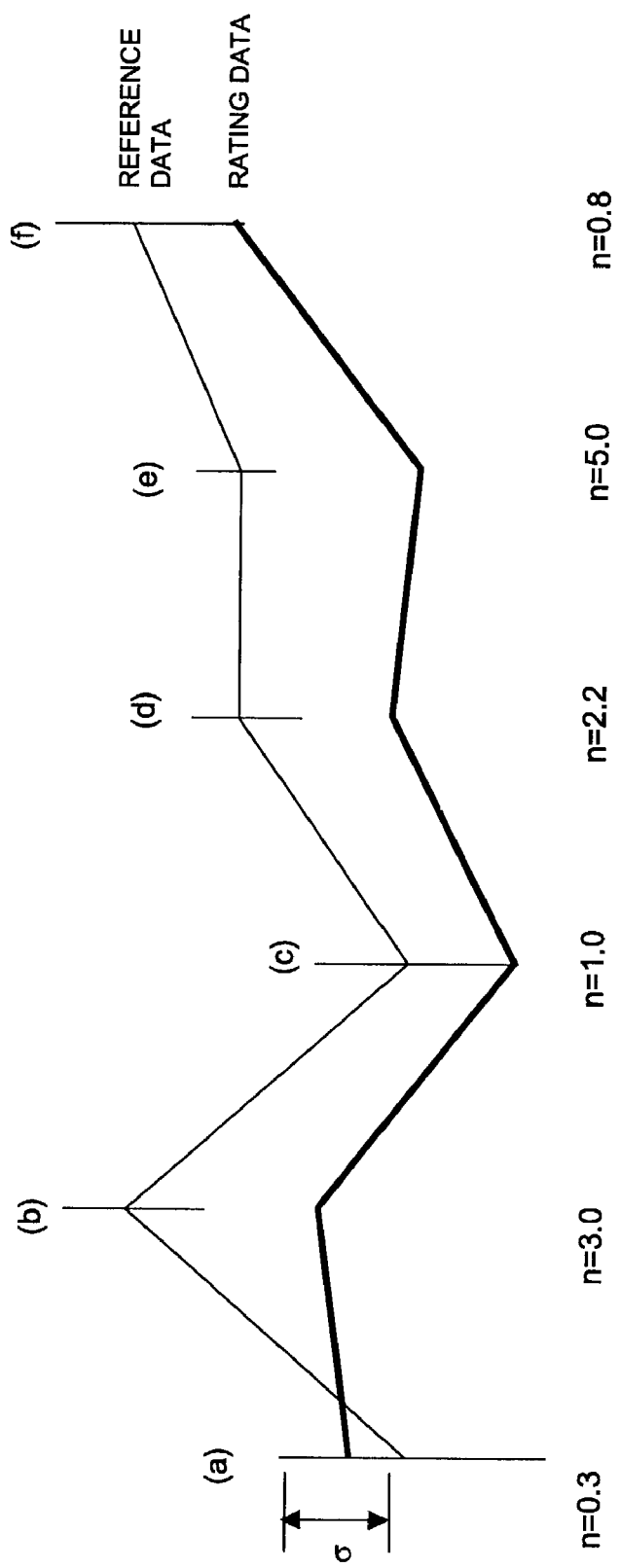
FIG. 10 is a diagram for describing the checking processing of input operation information in the authentication processing that takes into consideration standard deviation according to the present invention.

By applying the standard deviation vectors σDD, σUD, and σDU of the registered data stored in the database 406 to the above equation of [Formula 3] for computing the distance value, the distance value is computed wherein the distance between the less dispersed registered data and the input data vectors is rated highly, and the distance between the largely dispersed registered data and the input data vectors is rated low. FIG. 10 is a diagram for describing the concept of distance rating. Registered data (reference data) shown in the diagram has pieces of data at measurement points (a) to (f). A case is shown in which data at each measurement point shows a dispersion denoted by the vertical line. For example, the dispersion at the measurement point (a) is large, whereas the dispersion at the measurement point (e) is small.

If rating data is bold-line data shown in the diagram, the difference between the bold-line data and the registered data (reference data) denoted by the thin line is computed as the distance. For example, since data at the measurement point (a) has a large dispersion, the rated distance is n=0.3, that is, the distance is rated low. In a case of less dispersed data at the measurement point (e), the rated distance is n=5.0, that is, the distance is rated highly. A value corresponding to the sum of these distance values is compared with a threshold. Accordingly, the rating is performed with a heavier emphasis on the measurement point having less dispersed data that indicates an individual's characteristics in a clearer manner.

The authentication processing by the authentication processing apparatus in the above-described embodiment involves obtaining, by the authentication processing apparatus, a character string that corresponds to a character string input from the input unit, from the registered data stored in the authentication information database (DB) and checking one character string against another. Accordingly, the authentication processing is based on arbitrary keystrokes performed by a person for which authentication is performed using the input unit. The authentication processing requires no special key input. The authentication processing is thus executable in accordance with key input performed by a user to make a processing request to the information processing apparatus.

In the above embodiment, an example of the authentication processing using operation information obtained by the key input processing using the keyboard has been described. The authentication processing apparatus is only required to perform authentication by checking operation information input from the input unit against various operation information registered in the authentication information database. Not only the key input operation information but also various other operation information is applicable to the authentication processing.

For example, the authentication processing apparatus obtains information concerning a mouse operation sequence as input operation information, stores a registered user's mouse operation sequence information as operation characteristic information in the authentication information database serving as storage means, and performs authentication by checking against the mouse operation sequence information. Alternatively, the authentication processing apparatus obtains information concerning a processing sequence of a program executable by the information processing apparatus as input operation information, stores a registered user's program processing sequence information as operation characteristic information in the authentication information database, and performs authentication by checking against the program processing sequence information. Alternatively, the authentication processing apparatus obtains information indicating the frequency of inputting a specific key as input operation information, stores a registered user's specific key inputting frequency information as operation characteristic information in the authentication information database, and performs authentication by checking against the specific key inputting frequency information.

More specifically, operation habits, e.g., the frequency of clicking the mouse, the speed of the mouse movement, the mouth track of selecting operation (for example, straight line, curved line, zigzag, etc.), the clicking time interval when double clicking or triple clicking the mouse, and the frequency of using a specific key of the keyboard (left/right shift keys, function keys, numerical keypad, etc.), are stored in the individual authentication database. Authentication is made possible by checking operation information against these pieces of registered information.

Furthermore, operation types, e.g., the frequency of inputting a specific word using the keyboard, the frequency of using each application, the frequency of using each specific function of an application, and the window arrangement information in the window system, are stored in the individual authentication database. Authentication is made possible by comparing operation information against these pieces of registered information.

Furthermore, information or data obtained from a series of procedures for performing a specific operation, e.g., a plurality of processes performed to activate an application, namely, double-clicking on an application icon, designating a file, double-clicking on a document data icon, and activating a start menu, are stored in the individual authentication database. Authentication is made possible by checking operation information against these pieces of registered information. Information obtained from a procedure for performing a specific operation may also include information obtained from a procedure for deleting a file, the procedure involving pressing a delete key, using a trash box, and right-clicking the mouse to delete the file, as registered information. Furthermore, information concerning the use of specific functions, e.g., selecting and designating a process from a menu bar, selecting and activating an icon, right-clicking the mouse to select an item from the menu, and using a shortcut key, are stored in the individual authentication database as information obtained from procedures in accordance with a specific user interface. Authentication is made possible by checking operation information against these pieces of registered information.

An embodiment will now be described in which at least one keyword is registered in a keyboard database, the keyword being a frequently performed key input sequence, whether or not there is an input corresponding to the registered keyword is determined, and the authentication processing is performed only when it is determined that there is an input corresponding to the registered keyword.

Figure 11:
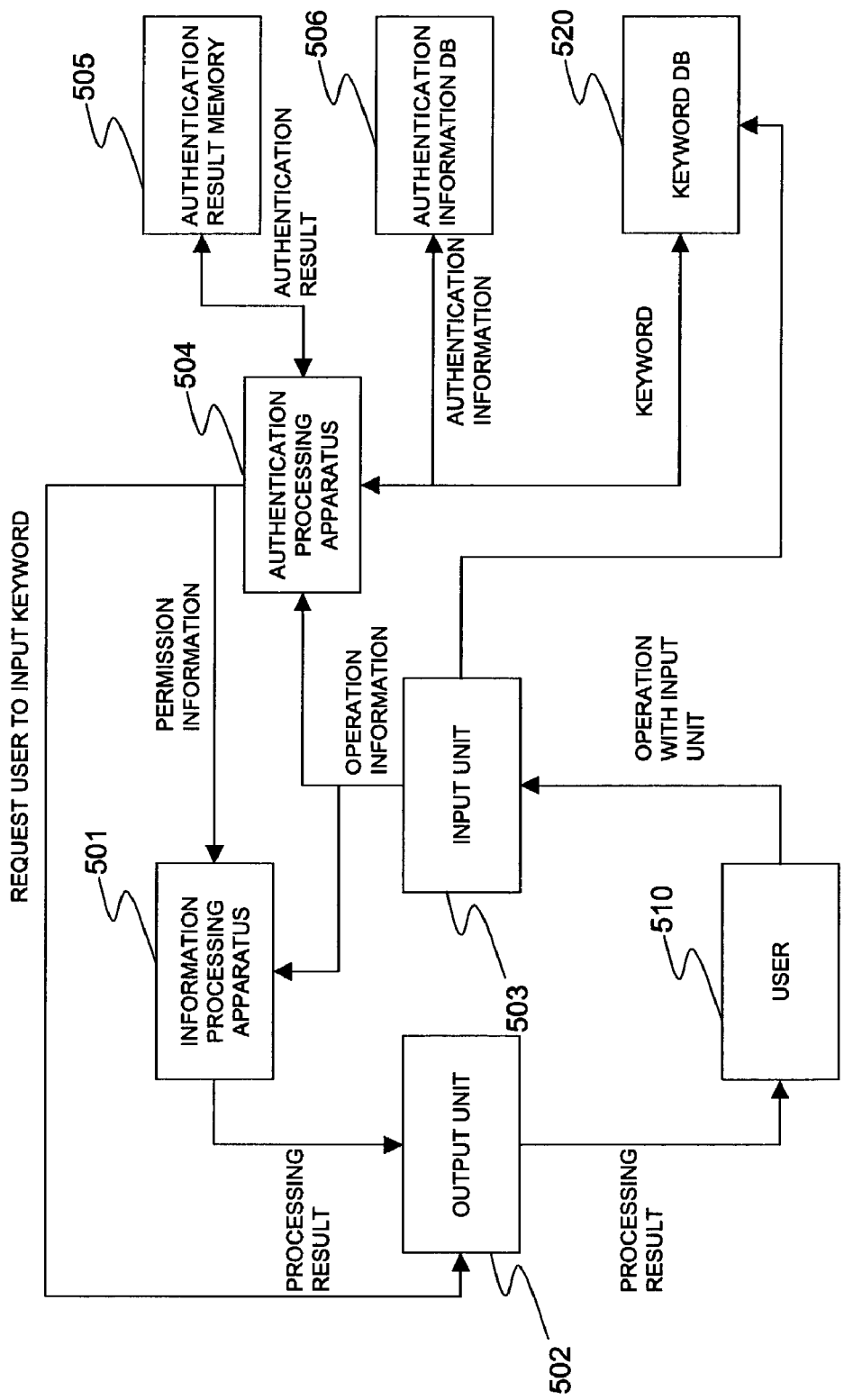
FIG. 11 is a diagram showing an example of the configuration of a system for performing the keyword-based authentication processing according to the present invention.

FIG. 11 is a block diagram of the configuration of a system to which an individual authentication processing apparatus of this embodiment is applied. With an input unit 503, a user 510 performs desired operations. The input unit 503 is a keyboard.

Operation information obtained from operating, by the user 510, the keyboard serving as the input unit 503 is input to an information processing apparatus 501 for performing the processing based on the operation information and to an authentication processing apparatus 504 for performing the individual authentication processing. The information processing apparatus 501 receives permission information from the authentication processing apparatus 504 when the authentication processing apparatus 504 performs the authentication processing and determines that the authentication is successful. On the basis of the receipt of the permission information, the information processing apparatus 501 performs the processing in accordance with the operation information input from the input unit 503 and outputs the result to an output unit 502. The output unit 502 is formed of display means, such as a CRT or LCD, or audio output means, such as a speaker.

Figure 12:
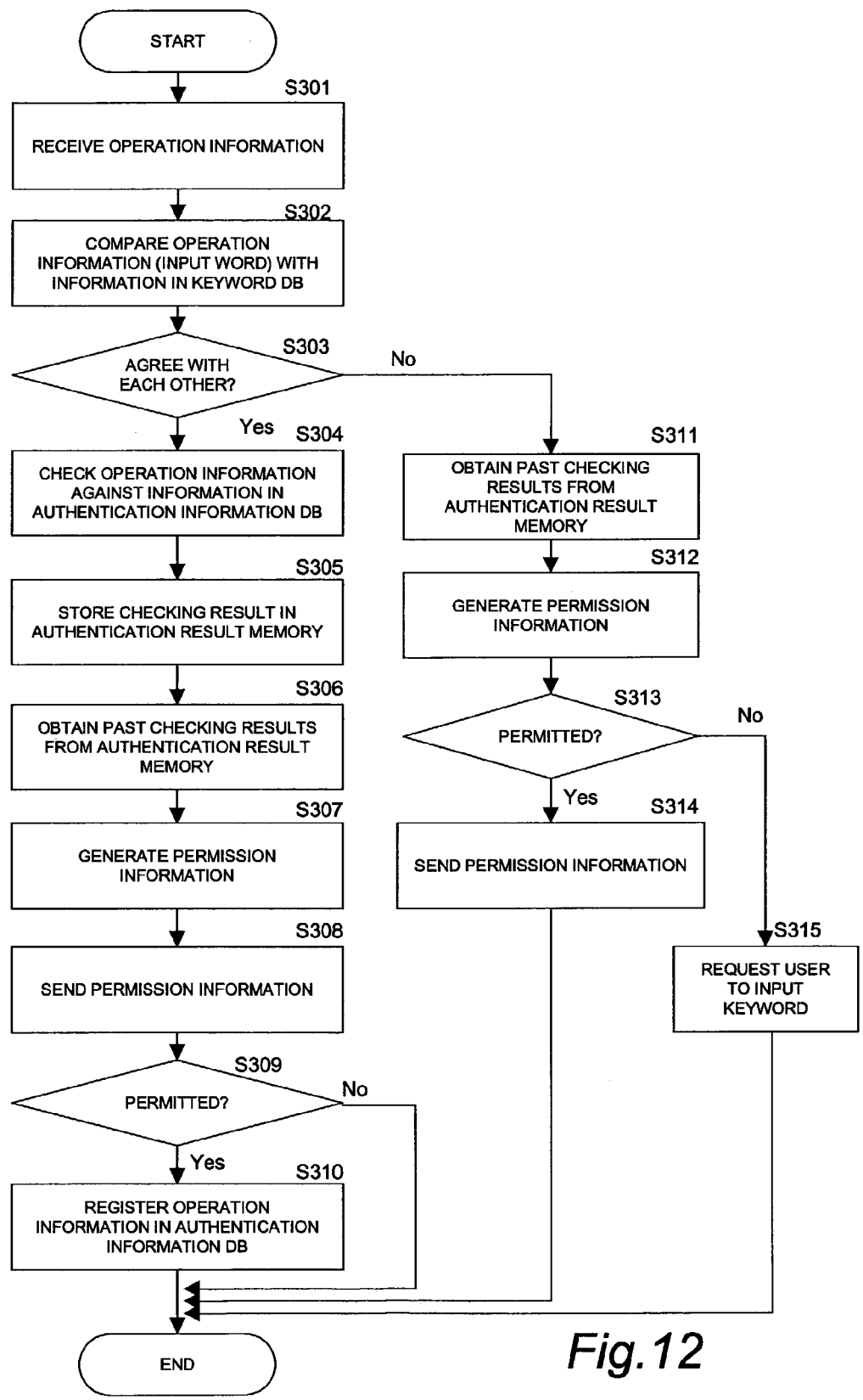
FIG. 12 is a flowchart showing the keyword-based processing by the authentication processing apparatus according to the present invention.

The authentication processing apparatus 504 checks a keyboard input word, which serves as operation information input from the input unit 503, against a word registered in a keyword database 520. When the two words agree with each other, the authentication processing apparatus 504 performs the authentication processing based on the checking processing of checking against authentication information stored in an authentication information database (DB) 506. FIG. 12 shows a processing flow of the authentication processing apparatus 504.

In accordance with the processing flow of FIG. 12, the processing by the authentication processing apparatus 504 will now be described. In step S301, the authentication processing apparatus 504 receives operation information based on user operation from the input unit 503. In step S302, the authentication processing apparatus 504 compares the input operation information (input word) against a keyword stored in the keyword database and determines whether or not the word input from the user is already registered.

When it is determined in step S303 that the input operation information (input word) agrees with the keyword stored in the keyword database, in step S304, the authentication processing apparatus 504 performs the checking processing of the input operation information against information in the authentication information database (DB). The processing involves the checking processing concerning, for example, (1) $DD_n=D_n-D_{n-1}$, (2) $UD_n=U_n-D_n$, and (3) $DU_n=D_n-U_{n-1}$, which have been described in the previous embodiment. In step S305, the authentication processing apparatus 504 stores the checking result in an authentication result memory 505.

In step S306, the authentication processing apparatus 504 obtains checking result log up to the present from the authentication result memory 505. In step S307, the authentication processing apparatus 504 generates permission information on the basis of the obtained authentication log information. In step S308, the authentication processing apparatus 504 outputs the permission information to the information processing apparatus 501. The permission information may be a processing permission signal based on successful authentication or a processing prohibition signal based on unsuccessful authentication. When authentication is successful and permission information indicating that the processing is permitted is thus sent to the information processing apparatus 501, in step S310, the operation information is registered in the authentication information database (DB) 506, and the processing is terminated. When authentication is unsuccessful and permission information indicating that the processing is prohibited is sent, the operation information is not registered in the authentication information database (DB) 506, and the processing is terminated.

When it is determined in step S303 that the input operation information (input word) disagrees with the keyword stored in the keyword database, in step S311, the authentication processing apparatus 504 obtains checking result log up to the present from the authentication result memory 505. In step S312, the authentication processing apparatus 504 generates permission information on the basis of the obtained authentication log information. If the processing is to be permitted, the authentication processing apparatus 504 outputs the permission information to the information processing apparatus 501. The permission information is a processing permission signal based on successful authentication. In contrast, when the processing is to be prohibited, in step S315, the authentication processing apparatus 504 performs the processing to request the user to input a keyword. This is advantageous in a case in which, for example, when no keyword has been input in a predetermined number of past operations, such as n operations, the user is requested to input a keyword for performing keyword-based authentication, and multiple operations are permitted by the authentication based on the keyword input once.

[System Configuration]

Figure 13:
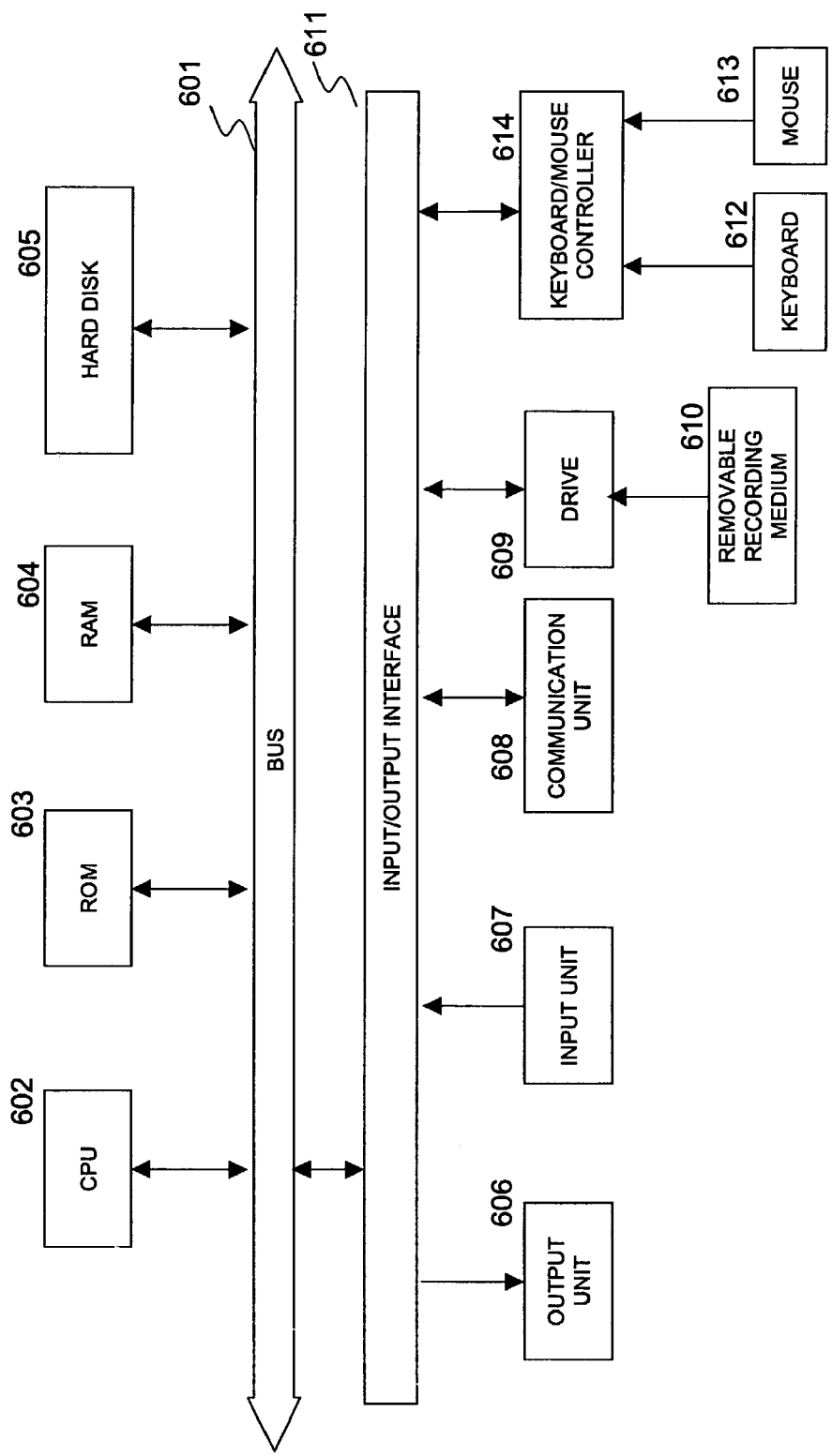
FIG. 13 is a diagram showing an example of the configuration of a system for performing the processing according to the present invention.

A series of processes by the authentication processing apparatus of the present invention described in the above-described embodiments can be performed by hardware, software, or a combination of both. When performing the software-based processing, a computer program having recorded therein a processing sequence is installed in a memory in a data processing apparatus included in dedicated hardware, and the computer program is thus executed. Alternatively, the program is installed in a general computer capable of performing various processes, and the program is thus executed. When performing the series of processes by software, a program forming the software is installed in, for example, a general computer or a one-chip microcomputer. FIG. 13 shows an example of the hardware configuration embodying the system configuration of FIG. 4.

The system includes a CPU (Central Processing Unit) 602. The CPU (Central Processing Unit) 602 actually executes various application programs and an OS (Operating System). A ROM (Read-Only-Memory) 603 stores programs executed by the CPU 602 or fixed data serving as arithmetic parameters. A RAM (Random Access Memory) 604 is used as a storage area and/or a work area for programs executed by the CPU 602 and parameters changing in accordance with the processing of the programs. The CPU 602, the ROM 603, the RAM 604, and a hard disk 605 are connected to one another by a bus 601 and can transfer data to one another. Also, data transfer between these components and various input/output units connected to an input/output interface 611 is made possible.

A keyboard 612 and a mouse 613 are operated by a user to input various instructions to the CPU 602. The keyboard 612 and the mouse 613 are operated to input command input data via a keyboard/mouse controller 614.

A drive 609 is a drive for recording/reading a removable recording medium 610 such as a CD-ROM (Compact Disc Read Only Memory), an MO (Magneto optical) disc, a DVD (Digital Versatile Disc), a magnetic disc, or a semiconductor memory. The drive 609 reads a program or data from each removable recording medium 610 and stores a program or data in each removable recording medium 610.

When an instruction is input using the keyboard 612 or the mouse 613 via the input/output interface 611, the CPU 602 executes a program stored in the ROM (Read Only Memory) 603 in accordance with the input.

The CPU 602 can load not only a program stored in the ROM but also a program stored in the hard disk 605, a program transferred from a satellite or network, received at a communication unit 608, and installed in the hard disk 605, or a program read from the removable recording medium 610 placed on the drive 609 and installed in the hard disk 605 into the RAM (Random Access Memory) 604 and execute the program.

In the system with the arrangement shown in FIG. 13, the CPU 602 performs the processing in accordance with the above-described embodiments or the processing in accordance with the above-described block diagrams and flowcharts. The CPU 602 sends the processing result from the communication unit 608. If necessary, for example, the CPU 602 outputs the processing result via, for example, the input/output interface 611 and the output unit 606 to a display device such as an LCD (Liquid Crystal Display) or a CRT. Also, the CPU 602 can store the processing result in a recording medium such as the hard disk 605 or the like.

A program for performing various processes is pre-recorded in the hard disk 605 or the ROM 603 serving as a recording medium included in the system. Alternatively, the program may be temporarily or permanently stored (recorded) in the removable recording medium 610 such as a floppy disc, a CD-ROM (Compact Disc Read Only Memory), an MO (Magneto optical) disc, a DVD (Digital Versatile Disc), a magnetic disc, or a semiconductor memory. Such a removable recording medium 610 can be provided as so-called packaged software.

The program can be installed from the above-described removable recording medium 610 into a computer. Alternatively, the program can be wirelessly transferred from a download site via an artificial satellite for digital satellite broadcasting to a computer or transferred by wire through a network such as a LAN (Local Area Network) or the Internet to a computer. The computer receives the program transferred in such a manner at the communication unit 608, and the program is thus installed in the built-in hard disk 605.

In the description, processing steps for writing the program that causes the computer to perform various processes are not required to be processed in time series in accordance with the order described in the flowcharts. Steps which are performed in parallel with one other or which are performed individually (for example, parallel processing or processing by an object) are also included.

The program can be processed by a single computer. Alternatively, the program can be processed by a plurality of computers in a decentralized environment. Furthermore, the program can be transferred to a remote computer to be executed.

While the present invention has been described in detail with reference to the specific embodiments, it is to be understood that modifications and substitutions can be made by those skilled in the art without departing from the scope of the present invention. In other words, the present invention has been described using the embodiments only for illustration purposes and should not be interpreted in a limited manner. The scope of the present invention is to be determined solely by the appended claims.

Various processes described in this description are not only performed in time series in accordance with the written order, but also parallel or discrete processing of the processes in accordance with the processing capacity of an apparatus that performs the processes is possible. The word system in this specification refers to the logical integrated configuration including a plurality of apparatuses and is not limited to apparatuses in the same casing.

INDUSTRIAL APPLICABILITY

As is clear from the above description, according to the present invention, the authentication processing based on normal operation information obtained from normally operating an information processing apparatus is made possible. A user is thus not required to perform the special input processing for the authentication processing.

According to the present invention, the configuration implements authentication by applying a plurality of pieces of characteristic information serving as each individual's authentication information while a plurality of different pieces of operation information, such as a plurality of keyboard input modes, are taken into consideration. The user authentication processing is thus performed with high accuracy.

According to the present invention, less dispersed data of a plurality of pieces of operation information indicating an individual's extracted characteristics is weighted, and input operation information is checked against the weighted information. The user authentication processing is thus performed with high accuracy.

The invention claimed is:

1. An individual authentication processing apparatus for performing individual authentication, wherein:
   the individual authentication processing apparatus obtains normal operation information from normally operating, by a user, input means of an information processing apparatus;
   extracts an individual's operation characteristic information from the normal operation information;
   is capable of checking the individual's extracted operation characteristic information against a registered user's operation characteristic information stored in storage means every time the normal operation information is obtained;
   generates, on the basis of a result of the checking processing, permission information for determining whether or not to permit the processing in accordance with user operation of the input means to be performed on the information processing apparatus; and
   outputs the generated permission information to the information processing apparatus.

2. The individual authentication processing apparatus according to claim 1, wherein, when generating the permission information, the individual authentication processing apparatus refers to past checking log data stored in a checking result memory that stores past checking results, generates the permission information based on the checking log data, and outputs the permission information to the information processing apparatus.

3. The individual authentication processing apparatus according to claim 1, wherein the operation characteristic information is information on characteristics of key input with a keyboard serving as the input means, the operation characteristic information is information including:
   $DD_n$ representing time from pressing a previously input key to pressing a subsequently input key;
   $UD_n$ representing time from pressing a key to releasing the key; and
   $DU_n$ representing time from releasing the previously input key to pressing the subsequently input key, and the checking processing against the registered user's operation characteristic information stored in the storage means is performed by comparing a distance value d with a predetermined threshold, the distance value d being between input vectors DD, UD, and DU formed of the $DD_n$, $UD_n$, and $DU_n$ and mean vectors [DD], [UD], and [DU] of the registered user's operation characteristic information stored in the storage means.

4. The individual authentication processing apparatus according to claim 3, wherein the distance value d is computed on the basis of the equation $d=|DD-[DD]|+k|UD-[UD]|+l|UD-[DU]|$ where k and l are coefficients.

5. The individual authentication processing apparatus according to claim 1, wherein the storage means stores integrated pieces of operation characteristic information data concerning the same operation by the registered user; and the checking processing of the operation characteristic information extracted from the normal operation information is performed by weighting less dispersed data of the integrated pieces of characteristic information data concerning the same operation by the registered user, which are stored in the storage means, more heavily than widely dispersed data.

6. The individual authentication processing apparatus according to claim 1, wherein the operation characteristic information is information on characteristics of key input with a keyboard serving as the input means, the operation characteristic information is information including:
   $DD_n$ representing time from pressing a previously input key to pressing a subsequently input key;
   $UD_n$ representing time from pressing a key to releasing the key; and
   $DU_n$ representing time from releasing the previously input key to pressing the subsequently input key, and the checking processing against the registered user's operation characteristic information stored in the storage means is performed by comparing a distance value d with a predetermined threshold, the distance value d being computed on the basis of the equation $d=|(DD-[DD])/\sigma DD|+k|(UD)-[UD])/\sigma UD-|+l|DU-[DU])/\sigma DU|$ where DD, UD, and DU are input vectors formed of the DDn, UDn, and DUn, [DD], [UD], and [DU] are mean vectors of the registered user's operation characteristic information stored in the storage means, σDD, σUD, and σDU are standard deviation vectors obtained on the basis of the registered user's operation characteristic information stored in the storage means, and k and l are coefficients.

7. The individual authentication processing apparatus according to claim 1, wherein the individual authentication processing apparatus includes a keyword registration database that stores a word based on which the authentication processing is performed as a keyword, and on condition that it is detected that the word registered in the keyword registration database is input from the input means, the checking processing is performed on the basis of normal operation information obtained from normally operating, by the user, the input means in accordance with the input word.

8. The individual authentication processing apparatus according to claim 1, wherein the normal operation information is information concerning an operation sequence of a mouse;
the storage means stores the registered user's mouse operation sequence information as the operation characteristic information; and
the checking processing is performed by checking against the mouse operation sequence information.

9. The individual authentication processing apparatus according to claim 1, wherein the normal operation information is information concerning a processing sequence of a program executable by the information processing apparatus;
the storage means stores the registered user's program processing sequence information as the operation characteristic information; and
the checking processing is performed by checking against the program processing sequence information.

10. The individual authentication processing apparatus according to claim 1, wherein the normal operation information is information on the frequency of inputting a specific key;
the storage means stores the registered user's specific key inputting frequency information as the operation characteristic information; and
the checking processing is performed by checking against the specific key inputting frequency information.

11. The individual authentication processing apparatus according to claim 1, wherein the individual authentication processing apparatus includes:
an operation unit serving as the input means that outputs a code in accordance with the user operation;
an extraction unit that extracts an individual's operation characteristic information from normal operation information obtained from normally operating the operation unit by a user;
a checking unit that checks the individual's operation characteristic information extracted by the extraction unit against a registered user's operation characteristic information pre-registered in a storage medium; and
an output unit that outputs permission information to the information processing apparatus in accordance with a checking result by the checking unit, the permission information permitting the processing in accordance with user operation of the input means to be performed on the information processing apparatus, wherein the extraction unit generates the individual's operation characteristic information at least based on output time and output transition time, the output time being from output start time to output end time of the code output from the operation unit, and the output transition time being generated from the output end time of the output code and output start time of a code output subsequent to the code.

12. The individual authentication processing apparatus according to claim 11, wherein the extraction unit generates the individual's operation characteristic information on the basis of code interval time, which is a difference between the output start time of the code output from the operation unit and the output start time of the code output subsequent to the code.

13. The individual authentication processing apparatus according to claim 11, wherein the checking unit performs the checking processing by computing and comparing the registered user's output time and output transition time registered in the storage medium with the output time and the output transition time generated by the extraction unit.

14. The individual authentication processing apparatus according to claim 11, wherein the extraction unit weights and adds a difference between the registered user's output time registered in the storage medium and the output time generated by the extraction unit and a difference between the registered user's output transition time registered in the storage means and the output transition time generated by the extraction unit and compares the sum with a threshold.

15. The individual authentication processing apparatus according to claim 1, wherein the individual authentication processing apparatus includes:
an operation unit serving as the input means that outputs a code in accordance with the user operation;
an extraction unit that extracts an individual's operation characteristic information based on output time from output start time to output end time of the code output from the operation unit;
a storage medium that records the operation characteristic information every time the code is output from the operation unit;
a rating unit that rates dispersion of the operation characteristic information recorded in the storage medium;
a checking unit that compares the individual's operation characteristic information extracted by the extraction unit with a registered user's operation characteristic information pre-registered in the storage medium and performs the checking processing in accordance with the dispersion of the operation characteristic information rated by the rating unit; and
an output unit that outputs permission information to the information processing apparatus in accordance with a checking result by the checking unit, the permission information permitting the processing in accordance with user operation of the input means to be performed on the information processing apparatus.

16. The individual authentication processing apparatus according to claim 15, wherein the rating unit rates the dispersion on the basis of standard deviation of a plurality of output times corresponding to the code.

17. The individual authentication processing apparatus according to claim 16, wherein the checking unit compares a rated value against a threshold, the rated value being obtained by dividing a difference between output time stored in the storage means and output time newly generated by the extraction unit by the standard deviation.

18. An individual authentication processing method of performing individual authentication, comprising:
   a step of obtaining normal operation information from normally operating, by a user, input means of an information processing apparatus;
   a step of extracting an individual's operation characteristic information from the normal operation information and capable of checking the individual's extracted operation characteristic information against a registered user's operation characteristic information stored in storage means every time the normal operation information is obtained; and
   a step of generating, on the basis of a result of the checking processing, permission information for determining whether or not to permit the processing in accordance with user operation of the input means to be performed on the information processing apparatus and outputting the generated permission information to the information processing apparatus.

19. The individual authentication processing method according to claim 18, wherein, when generating the permission information, the individual authentication processing method refers to past checking log data stored in a checking result memory that stores past checking results and generates the permission information on the basis of the checking log data.

20. The individual authentication processing method according to claim 18, wherein the operation characteristic information is information on characteristics of key input with a keyboard serving as the input means, the operation characteristic information is information including:
   DDn representing time from pressing a previously input key to pressing a subsequently input key;
   UDn representing time from pressing a key to releasing the key; and
   DUn representing time from releasing the previously input key to pressing the subsequently input key, and the checking processing against the registered user's operation characteristic information stored in the storage means is performed by comparing a distance value d with a predetermined threshold, the distance value d being between input vectors DD, UD, and DU formed of the DDn, UDn, and DUn and mean vectors [DD], [UD], and [DU] of the registered user's operation characteristic information stored in the storage means.

21. The individual authentication processing method according to claim 20, wherein the distance value d is computed on the basis of the equation d=|DD−[DD]|+k|UD−[UD]|+l|UD−[DU]| where k and l are coefficients.

22. The individual authentication processing method according to claim 18, wherein the storage means stores integrated pieces of operation characteristic information data concerning the same operation by the registered user; and
   the checking processing of the operation characteristic information extracted from the normal operation information is performed by weighting less dispersed data of the integrated pieces of characteristic information data concerning the same operation by the registered user, which are stored in the storage means, more heavily than widely dispersed data.

23. The individual authentication processing method according to claim 18, wherein the operation characteristic information is information on characteristics of key input with a keyboard serving as the input means, the operation characteristic information is information including:
   DDn representing time from pressing a previously input key to pressing a subsequently input key;
   UDn representing time from pressing a key to releasing the key; and
   DUn representing time from releasing the previously input key to pressing the subsequently input key, and the checking processing against the registered user's operation characteristic information stored in the storage means is performed by comparing a distance value d with a predetermined threshold, the distance value d being computed on the basis of the equation d=|(DD−[DD])/σDD|+k|(UD)−[UD])/σUD−|+l|(DU−[DU])/σDU| where DD, UD, and DU are input vectors formed of the DDn, UDn, and DUn, [DD], [UD], and [DU] are mean vectors of the registered user's operation characteristic information stored in the storage means, σDD, σUD, and σDU are standard deviation vectors obtained on the basis of the registered user's operation characteristic information stored in the storage means, and k and l are coefficients.

24. The individual authentication processing method according to claim 18, wherein a keyword registration database is provided that stores a word based on which the authentication processing is performed as a keyword, and on condition that it is detected that the word registered in the keyword registration database is input from the input means, the checking processing is performed on the basis of normal operation information obtained from normally operating the input means by the user.

25. The individual authentication processing method according to claim 18, wherein the normal operation information is information concerning an operation sequence of a mouse;
   the storage means stores the registered user's mouse operation sequence information as the operation characteristic information; and
   the checking processing is performed by checking against the mouse operation sequence information.

26. The individual authentication processing method according to claim 18, wherein the normal operation information is information concerning a processing sequence of a program executable by the information processing method;
   the storage means stores the registered user's program processing sequence information as the operation characteristic information; and
   the checking processing is performed by checking against the program processing sequence information.

27. The individual authentication processing method according to claim 18, wherein the normal operation information is information on the frequency of inputting a specific key;
   the storage means stores the registered user's specific key inputting frequency information as the operation characteristic information; and
   the checking processing is performed by checking against the specific key inputting frequency information.

28. A computer program for performing individual authentication, comprising:
   a step of obtaining normal operation information from normally operating, by a user, input means of an information processing apparatus;
   a step of extracting an individual's operation characteristic information from the normal operation information and capable of checking the individual's extracted operation characteristic information against a registered user's operation characteristic information stored in storage means every time the normal operation information is obtained; and a step of generating, on the basis of a result of the checking processing, permission information for determining whether or not to permit the processing in accordance with user operation of the input means to be performed on the information processing apparatus and outputting the generated permission information to the information processing apparatus.

* * * * *